United States Patent [19]
Haskell et al.

[11] Patent Number: 6,055,012
[45] Date of Patent: *Apr. 25, 2000

[54] DIGITAL MULTI-VIEW VIDEO COMPRESSION WITH COMPLEXITY AND COMPATIBILITY CONSTRAINTS

[75] Inventors: Barin Geoffry Haskell, Tinton Falls, N.J.; Atul Puri, Riverdale, N.Y.; Richard Virgil Kollarits, Colts Neck, N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,334

[22] Filed: Dec. 27, 1996

Related U.S. Application Data

[60] Provisional application No. 60/009,430, Dec. 29, 1995.

[51] Int. Cl.[7] .................................................. H04N 13/00
[52] U.S. Cl. ............................................. 348/48; 348/409
[58] Field of Search .................................. 348/42, 45–60, 348/564, 43, 402, 407, 409–413, 415, 416, 699; 351/201; 345/425; H04N 7/18, 13/00

[56] References Cited

U.S. PATENT DOCUMENTS

| | | | |
|---|---|---|---|
| 4,623,223 | 11/1986 | Kempf | 348/51 |
| 4,641,178 | 2/1987 | Street | 348/57 |
| 4,874,235 | 10/1989 | Webster | 351/201 |
| 5,193,000 | 3/1993 | Lipton et al. | 348/43 |
| 5,495,576 | 2/1996 | Ritchey | 345/425 |
| 5,546,120 | 8/1996 | Miller et al. | 348/59 |
| 5,612,735 | 3/1997 | Haskell et al. | 348/43 |
| 5,619,256 | 4/1997 | Haskell et al. | 348/47 |
| 5,649,897 | 7/1997 | Nakamura et al. | 348/45 |

OTHER PUBLICATIONS

Video Coding Using the MPEG–2 Compression Standard, A. Puri; Proceedings of SPIE Visual communications and Image Processing, Boston, Mass., Nov. 1993, pp. 1701–1713.

Generic Coding of Moving Pictures and Associated Audio, Video Draft Editing Committee; Recommendation H.262, ISO/IEC 13818–2, International Standard for Video, Singapore, No. 1994.

Stereoscopic Video Compression Using Temporal Scalability, A. Puri, R.V. Kollarits and B.G. Haskell, Proceedings of SPIE Visual Communications and Image Processing, Taipei, Taiwan, May 1995.

Coding of Moving Pictures and Associated Audio, A. Puri; International Organisation For Standardization; ISO/IEC JTC1/SC29/WG11; Mar. 1994.

*Primary Examiner*—Richard Lee
*Attorney, Agent, or Firm*—Darby & Darby

[57] ABSTRACT

In a system and method for transmitting and displaying multiple different views of a scene, three or more simultaneous scene signals, representing multiple different views of a scene, are provided by an appropriate camera arrangement to a spatial multiplexer. The size and resolution of the scene signals are reduced as necessary to combine the multiple scene signals into two super-view signals. The super-view signals are encoded using compression based on redundancies between the two super-views and then transmitted. A decoder receives the transmitted data signal and extracts the two super-view signals according to the inverse of the encoding operation. A spatial demultiplexer recovers the individual scene signals from the decoded super-view signals in accordance with a defined multiplexed order and arrangement. The scene signals are then interpolated as needed to restore the original resolution and size and subsequently displayed.

52 Claims, 17 Drawing Sheets

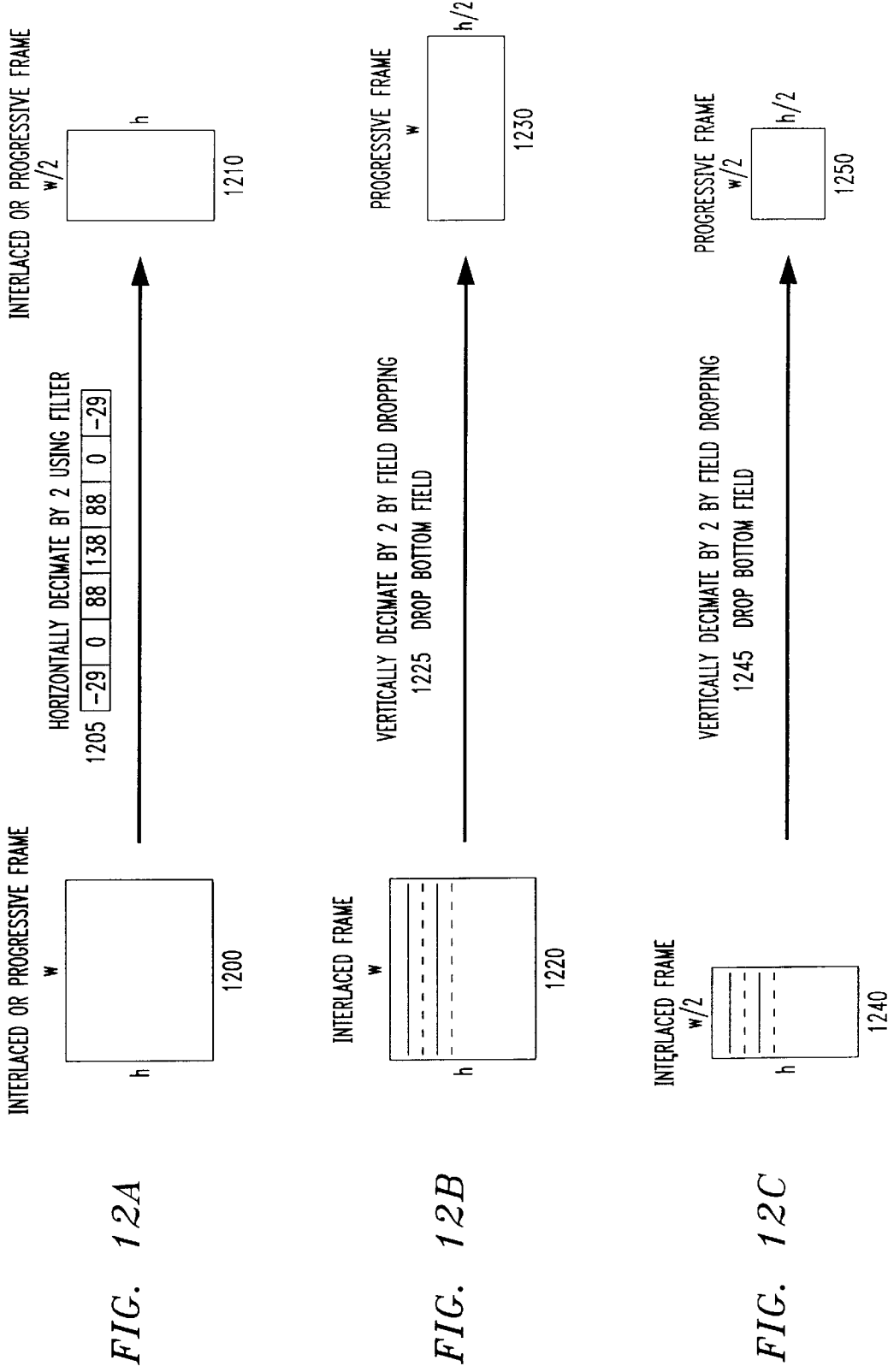

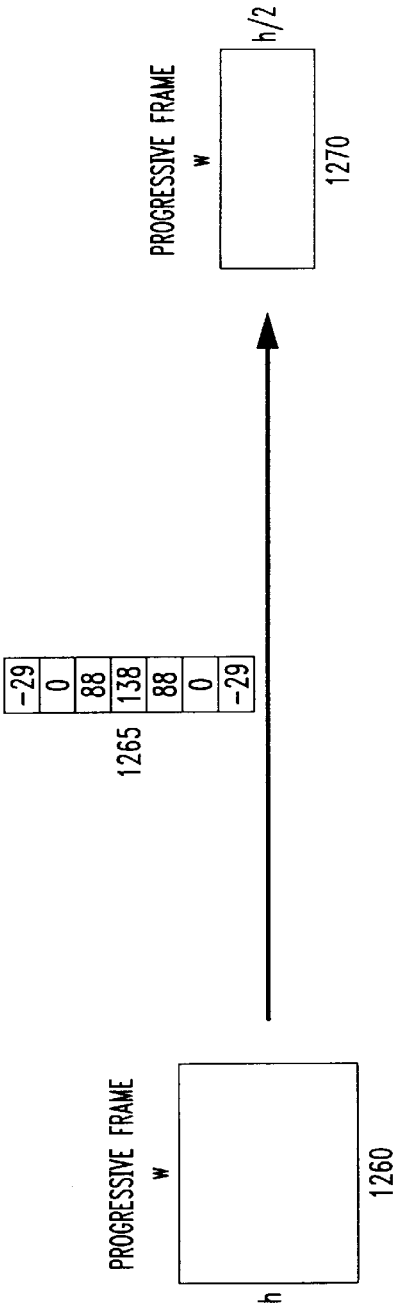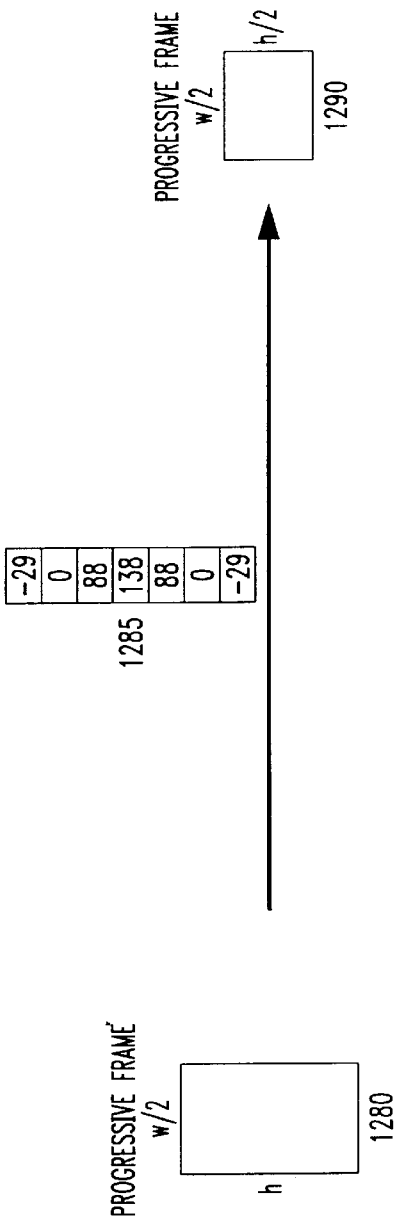

DIGITAL MULTI-VIEW VIDEO COMPRESSION WITH COMPLEXITY AND COMPATIBILITY CONSTRAINTS

RELATED APPLICATIONS

The present application claims priority from U.S. Provisional Application Ser. No. 60/009,430, filed Dec. 29, 1995.

The present application is related to the following allowed applications B. G. Haskell, R. V. Kollarits and A. Puri, "Digital Stereoscopic Video Compression Technique Utilizing Two Disparity Estimates," U.S. patent application Ser. No. 08/452,464 filed May 26, 1995, now U.S. Pat. No. 5,612,735; and B. G. Haskell, R. V. Kollarits and A. Puri, "Digital Stereoscopic Video Compression Technique Utilizing One Disparity and One Motion Estimate," U.S. patent application Ser. No. 08/452,463, filed May 26, 1995, now U.S. Pat. No. 5,619,256 both of which are incorporated herein by reference.

TECHNICAL FIELD

This invention is related to encoding and decoding of multiple simultaneous video signals with high coding efficiency and reduced complexity. More particularly, this invention relates to digital compression of multiple video signals representing several views of a scene by mapping these signals to a pair of video signals on which scalable (layered) coding can be applied.

BACKGROUND OF THE INVENTION

The human visual system is capable of comprehending an incredible amount, and a remarkable variety, of visual information presented to it. However, most machine imaging and display systems capture and present us with only a limited two dimensional (2D) window into the real three dimensional (3D) world. In certain specialized applications in defense, medicine, entertainment and others, several attempts have been made to introduce more sophisticated display systems that can portray visual information as it appears from various viewpoints. However, such applications essentially use analog signals, and are mainly standalone systems, rarely needing to interoperate or exchange data with others. Moreover, in many such applications, either graphics or more sophisticated computer generated animations are used, and multi-viewpoint video is not as prevalent. Recently there has been an emergence of more demanding applications in the area of virtual space conferencing, video games and multimedia presentations where not only more sophisticated displays are necessary but networked communication of compressed digital video data may also be necessary.

Multi-view video has potential applications in education, training, 3D movies/entertainment, medical surgery, video conferencing, virtual travel and shopping, multimedia presentations, video games, immersive virtual reality experiences, and others. Although the potential applications of multi-view video are many, there are several challenges to be overcome before its potential can be truly harnessed and it can become wide spread. For example, currently, most practical means of displaying stereoscopic video require viewers to use specialized viewing glasses. Although some displays not requiring specialized viewing glasses (autostereoscopic systems) are available, they impose other restrictions, e.g., viewing zones and discreetness of views which may typically require between 10 and 20 views for realism. Stereoscopic displays, on the other hand, require the use of specialized viewing glasses, but can impart the perception of depth in a scene.

There are other types of 3D displays that can also present a more realistic portrayal of the scene. However they are sometimes cumbersome and impose other restrictions. For example, it is well known that increasing resolution can impart an increased perception of realism. Thus HDTV systems can be used to enhance depth perception. The development of HDTV has necessitated advances in compact high resolution displays, high speed circuits for compression and decompression etc. A different technique to impart a high degree of realism is related to employing multiple viewpoints of a scene and immersing the viewer in the scene by virtue of a multiview display arrangement. These multiple viewpoints need to be imaged via suitable arrangements of cameras, encoded, decoded and displayed on a suitable arrangement of displays. Sometimes not all the displayed views need to be transmitted, stored or manipulated and only some representative views are used. Regardless, the complexity of multiview processing can be substantially high and represents a stumbling block in widespread use of such systems.

With the need for networked visual communication and the need to interchange data across a variety of applications, the need for video coding standards has arisen. Of particular relevance is the second phase of ISO Moving Pictures Experts Group (MPEG-2) video coding standard, which though only recently completed, is well recognized to offer a good solution to a large variety of applications requiring digital video including broadcast TV via satellite, cable TV, HDTV, digital VCRs, multipoint video and others. It is desirable to have compatible solutions that can be used for coding of multiview video with low complexity, while providing interoperability with other applications. Towards that end, the video codings algorithm tools of MPEG-2 video standard are of significant interest due to a large expected installed base of MPEG-2 video decoders with whom interoperability of multi-view applications may be necessary.

While efficient digital compression of multiview video is important, the capture of different views and the display of these views is closely related to it, since there should be a significant correlation between views for high coding efficiency. While it is possible to encode each of the views of multi-view video separately (simulcast), it is envisaged that combined coding of these views would be more efficient. It is possible to achieve joint coding of multiview video by two basic approaches. The first approach results in compatibility with normal video in the sense that one (or more) views may be decoded for normal video display, while all other views could be decoded for a truly multi-view display. The second approach involves joint coding without regard to compatibility and may presumably lead to higher compression but sacrifices interoperability. We adopt the first approach, and, although our invention can be used with other coding approaches as well, we use MPEG-2 based video codings to illustrate our technique.

Both the single layer (nonscalable) video coding as well as the layered (scalable) video coding framework of MPEG-2 video coding are exploited and extended by the present invention. Nonscalable video coding in MPEG-2 involves motion-compensated DCT coding of frame or field pictures and is dealt with in detail in Test Model Editing Committee, "MPEG-2 Video Test Model 5," ISO/IEC/JTC1/SC29WG11 Doc. N0400, April 1993; A. Puri, "Video Coding Using the MPEG-2 Compression Standard," Proceedings of SPIE Visual Communications and Image Processing, Boston, Mass., November 1993, pp. 1701–1713; Video Draft Editing Committee, "Generic Coding of Moving Pictures and Associated Audio," Recommendation H.262, ISO/IEC 13818-2, International Standard for Video, Singapore, No. 1994; and elsewhere. Among the scalable video coding schemes, our scheme is highly related to temporal scalability, which we have also used earlier as a basis for compression of stereoscopic video; see A. Puri, R. V. Kollarits and B. G. Haskell, "Stereoscopic Video Compression Using Temporal Scalability," Proceedings of SPIE Visual Communications and Image Processing, Taipei, Taiwan, May 1995.

Temporal scalability involves coding of video as two layers in time, such that the first layer, called the base-layer, can be decoded independently of the second layer, called the enhancement layer. A premise behind temporal scalability is to provide a base video stream or layer that has a particular frame rate which is the baseline or minimum that must be supported to properly display the video. The base layer can be coded with any coder, such as a block-based motion compensated DCT coder of MPEG-1 or nonscalable MPEG-2. To improve the video quality, an "enhancement" video stream is provided to carry intermediate frames so that more sophisticated viewers can display the video at a higher frame rate, e.g., the displayed frame rate can be temporally scaled to the capabilities of the display system. The enhancement layer also uses the motion compensated DCT structure but makes temporal predictions from images in the base layer. Since, there are no explicit restrictions on which coders to employ in the base and enhancement layers, other than the use of temporal prediction between layers, the underlying framework of temporal scalability is exploited and extended in our invention.

Currently, MPEG-2 has set up an ad hoc group to investigate how MPEG-2 can be applied to the coding of multi-view video, building on the existing framework of temporal scalability. Requirement Subgroup, "Status Report on the Study of Multi-view Profile", ISO/IEC JTC1/SC29/WG11 Doc. N0906, March 1995. However, it is also deemed necessary to come up with a practical realization of encoding/decoding that is acceptable in terms of complexity and does not require brand new types of coding/decoding hardware. It is expected that MPEG will specify interoperability between its nonscalable (Main Profile) video coding and the multi-view coding approach that it adopts. This interoperability is usually specified in terms of compliance points which various MPEG compatible systems must meet. The compliance points correspond to a discrete grid of allowed Profile and Level combinations. Profiles limit the syntax and semantics (i.e., algorithms) that MPEG compliant systems must be capable of processing. Levels limit coding parameters such as frame sample rates, frame dimensions, and coded bit rates, thus restricting the values certain parameters are allowed to take in the bitstream. For example, the MPEG-2 video "Main" Profile and "Main" Level were chosen to normalize complexity within feasible limits of 1994 VLSI technology (0.5 micron), yet still meet the needs of the majority of applications. Thus, the profile and levels implicitly specify the expected decoding complexity, and for instance in an anticipated Multi-view profile, a specification of a number of views to be decoded is necessary. There is considerable debate on how many views to support in a Multi-view profile due to significantly higher decoding complexity if more views are supported. We propose to circumvent the problem by only allowing two views—each called a super-view. However, each of the two super-views can include multiple low resolution views. Thus a decoder compliant to, for example, Main profile at Main level only decodes with a complexity typical of two layer temporal scalability, however, if higher resolution for these views is necessary, an encoder can choose to code at Main profile at High level, to which Main profile and Main level compliant decoders do not need to be interoperable.

The proposed technique of this invention provides a framework and a mapping that is necessary to address the problem of encoding/decoding of multiple views. Multi-view video comprising two or more image signals is mapped into a pair of "super-views and coded similar to our proposals for coding of stereoscopic video and high compression (B. G. Haskell, R. V. Kollarits and A. Puri, "Digital Stereoscopic Video Compression Technique Utilizing Two Disparity Estimates," U.S. patent application Ser. No. 08/452,464 filed May 26, 1995, now U.S. Pat. No. 5,612,735 and B. G. Haskell, R. V. Kollarits and A. Puri, "Digital Stereoscopic Video Compression Technique Utilizing One Disparity and One Motion Estimates," U.S. patent application Ser. No. 08/452,463 filed May 26, 1995, now U.S. Pat. No. 5,619,256 both of which are incorporated by reference). Considerable attention is given to camera arrangements as it impacts the exploitation of redundancy between different views. The encoder determines the mapping for spatial multiplexing of a number of views into two super-views so that the coding technique can maximally exploit correlations. Coding can be done using MPEG-2 or other coding schemes. As an additional issue, the next phase of MPEG (MPEG-4) also intends to support coding of multi-view video and thus the principals of this inventions are also applicable there, as far as a spatial multiplexing arrangement of many views is employed in coding.

SUMMARY OF THE INVENTION

Efficient digital compression of multiple simultaneous video streams representing different views of a scene is achieved, in accordance with our invention, by a novel technique in which various views forming multi-view video are coded by utilizing the redundancies between the views. Also, since direct coding/decoding of multiple views results in a decoder of high complexity proportional to the number of views to be coded/decoded, we provide a mapping which allows a reduction of complexity to that of coding of two views only. Further, coding is performed in a manner compatible with existing equipment and allows at least one or more views to be decoded for normal display. As an example of a practical realization, a motion compensated discrete cosine transform (DCT) coding framework according to existing standards such as the Moving Picture Experts Group-Phase 2 (MPEG-2) video standards is employed and when needed, extended, to result in a highly efficient yet practical coding scheme. The technique is general enough to be used with other types of video coding methods as well.

Coding of multi-view video begins with determining coding resolution for each view which is a function of the number of views, as well as a spatial multiplexing arrangement. The images are decimated by filtering and/or subsampling to reduce the resolution of views as necessary. The encoder determines an arrangement of these lower resolution views into two super-views such that efficient coding can be performed. It includes arrangement information as well as view capture information in the bitstream so that the decoder can decode this information and pass it on to the display process for demultiplexing of individual views and eventual display. Multi-view encoders and decoders use scalable (layered) coding and maintain compatibility with normal video by coding one layer independently and coding the other layer with respect to this independently coded layer. The MPEG-2 Main profile coding and MPEG-2 temporal scalability coding can be used, and when needed, extended, to accomplish coding of multiple views. The framework is flexible enough to allow use of other coding methods as well.

Our invention, accordingly utilizes first and second super-views, referred to herein as super-view 1 and super-view 2. Each super-view comprises a plurality of different distinct views of the scene to be transmitted for viewing at remote location.

BRIEF DESCRIPTION OF THE DRAWINGS

The foregoing and other features of the present invention will be more readily apparent from the following detailed description and drawings of illustrative embodiments of the invention in which:

FIG. 12a through 12e show examples of a decimation operation for reducing the spatial resolution of views prior to multiplexing them;

FIG. 13a through 13e show view multiplexing arrangements of reduced spatial resolutions views, in accordance with the invention;

DETAILED DESCRIPTION

Figure 1:
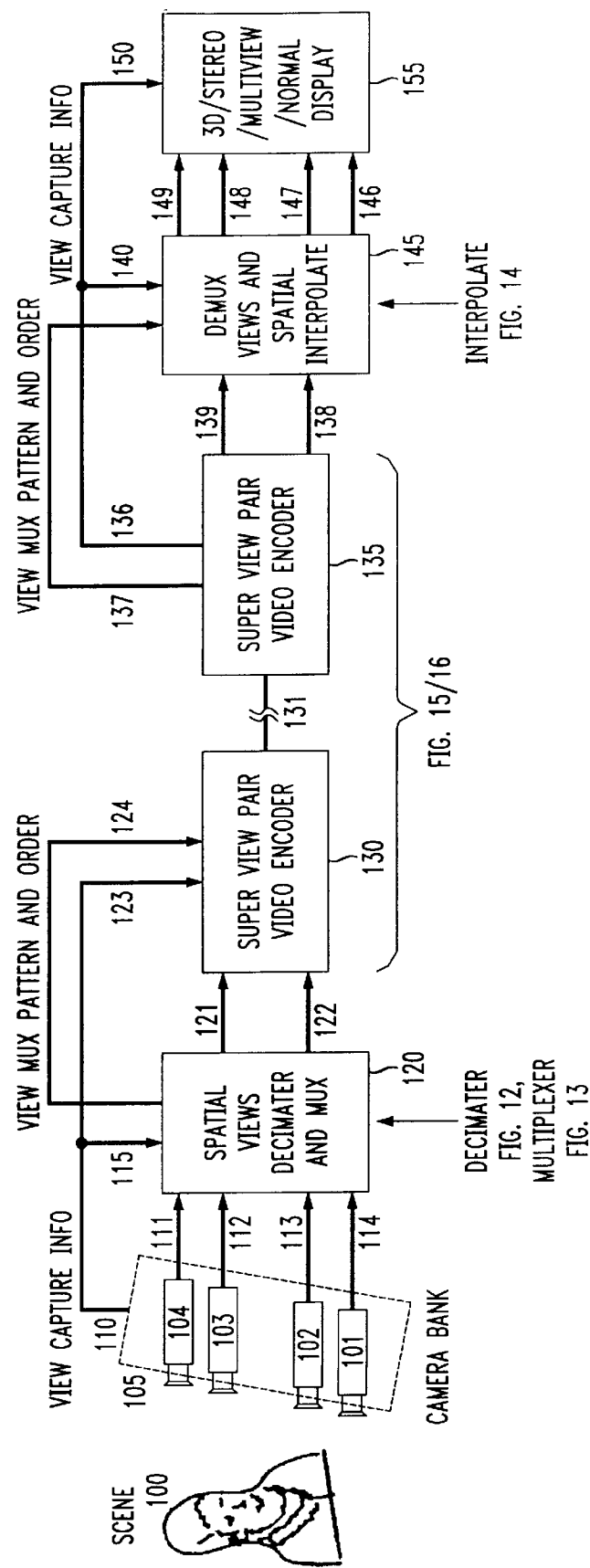
FIG. 1 shows a multi-view video imaging, coding/decoding and display system in accordance with our invention.

FIG. 1 shows a multi-view video imaging, coding/decoding and display system according to our invention to illustrate in detail, the framework and method of this invention which yields efficient compression of multi-view video while ensuring complexity constrained encoding/decoding and compatibility with normal video displays. A scene 100 is captured by a bank of cameras (or other imaging sensors) 105, where camera 101, 102, 103 and 104 capture corresponding different views of the scene and output them on lines 111, 112, 113 and 114. For the purposes of discussion we have assumed four cameras, each capturing a slightly different view of the scene, although in general, a camera may have multiple lens and be able to capture more than one view. Also, the cameras are assumed to be located side-by-side, however, in all generality, the cameras may be located in any configuration and each camera may have any orientation.

In the FIG. 1 example, the four views on lines 111, 112, 113 and 114 are input to a Spatial View Decimate and Multiplexer ("Mux") 120, which reduces the spatial resolution of the views for the purpose of generating two super-views by multiplexing the various views onto two lines. The two Mux signals are then output on lines 121 and 122 to Super View Pair Encoder 130. Encoder 130 takes the two input views and encodes them in such a manner that the first super-view is coded independently and the second super-view is coded with respect to a decoded first super-view in order to generate layered bitstreams, such as those obtained by using the temporal scalability of MPEG-2 video standard. Information regarding the arrangement used for capture of the views is available on line 110 and is sent to the Spatial Views Decimate and Mux 120 and to input 123 of Super View Pair Encoder 130. Also, the views multiplex arrangement and order used to multiplex views on lines 111, 112, 113 and 114 into two super-views on lines 121 and 122 are sent via line 124 to Encoder 130. The signals on line 123 and 124 are included as part of the layered bitstream generated by Encoder 130 on channel 131. The output of Encoder 130 is placed on channel 131.

The channel 131 may be either a communication channel or a storage media, and it either transmits or stores this output bitstream from Encoder 130. Super View Pair Video Decoder 135 decodes the bitstream and generates two layers of video on lines 138 and 139, respectively. Each decoded layer is a super-view signal which, in turn, comprises one or more multiplexed views. Each of the two decoded super view signals on lines 138 and 139 is sent to Views Demultiplexer and Spatial Interpolator 145, which demultiplexes each super-view into its component separate views, upsamples these views to full resolution (if needed) and outputs them on lines 146, 147, 148 and 149. Again, since in this example, four views are multiplexed into two super-views before encoding, after decoding, the exact reverse operation of demultiplexing two super-views in to four views takes place.

Decoder 135 decodes the view multiplex and pattern order, and sends it on line 137 to Interpolator 145. Decoder 135 also sends information on line 136 to input 140 of Interpolator 145 and input 150 of a 3D/Stereo Multi-view Display 155. The DeMux Views and Spatial Interpolator 145 uses the multiplex pattern and order, as well as the view capture information, to demultiplex super-views to individual views of lower resolution. The views on lines 146, 147, 148 and 149 are input to a display system 155.

There are many possibilities for the display system which include a normal display, a stereoscopic display, an autostereoscopic display, a general configuration of several monitors or projectors, etc. The display system 155 uses the view capture information at input 150 to facilitate matching the camera set up configuration to the display capabilities available.

Since Camera Bank 105 generates various views, some suited for a specific type of Display 155, examples of camera and display arrangements likely to be encountered in typical multi-view applications are set forth below. This will also provide some information about the number of views needed and what type of correlations may be present between the various views. Thus, in FIGS. 2 through 11 the details of various camera and display arrangements are given.

Figure 2:
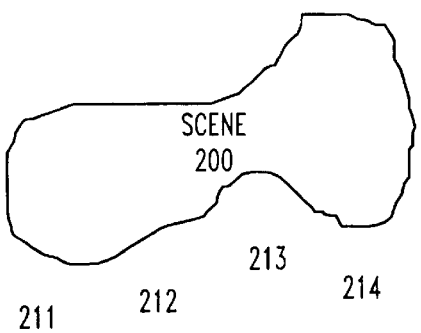
FIG. 2 shows an illustrative side-by-side flexible arrangement of cameras for imaging a scene.

In FIG. 2, there is an arrangement of 4 cameras, C1 (201), C2 (202), C3 (203) and C4 (204) in a side-by-side configuration, imaging a scene 200. Cameras 201, 202, 203 and 204 view portions 211, 212, 213 and 214 of the entire scene 200. The resulting four view video signals V1, V2, V3 and V4 appear on lines 111, 112, 113 and 114. Although, we have shown four (4) views, at least two (2) views are necessary for multi-view video and almost any number of views (within reason) is possible. Also, while the cameras are shown as a one-dimensional array, they can be in a two-dimensional array or any other arrangement. Moreover, there is no implied constraint to a parallel optical axis on the camera orientation geometry. While the arrangement of views can be application dependent, and thus very flexible, efficient coding can only be performed if there is significant correlation between the views.

Figure 3:
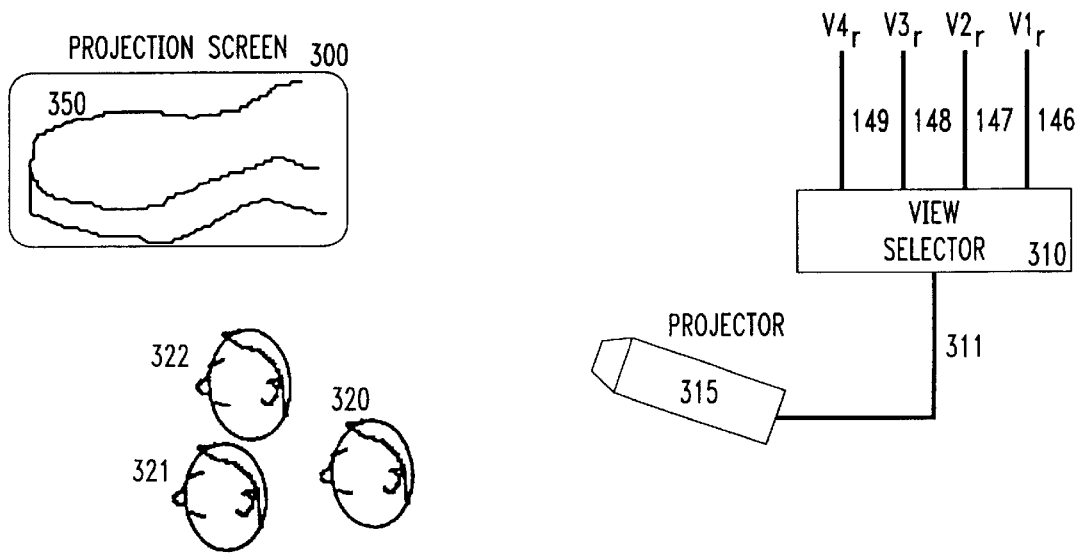
FIG. 3 shows a display arrangement for selecting one of the decoded views for display, in accordance with the invention.

FIG. 3 shows a display arrangement in which four decoded views on lines 146, 147, 148 and 149 are input to View Selector 310, which is simply a user controlled switch. The selector 310 feeds the chosen view via line 311 to a video projector 315 for projection to a screen 300. In this configuration, viewers 320, 321 and 322 view scene portion 350 on projection screen 300. Alternatively, instead of a projector and a projection screen, a TV display monitor can also be used. Furthermore, although not shown explicitly as one of the inputs to View Selector 310, an additional input can be one of the super-views (line 138 or line 139) for simultaneous display of multiple views with one projector (or TV monitor).

Figure 4:
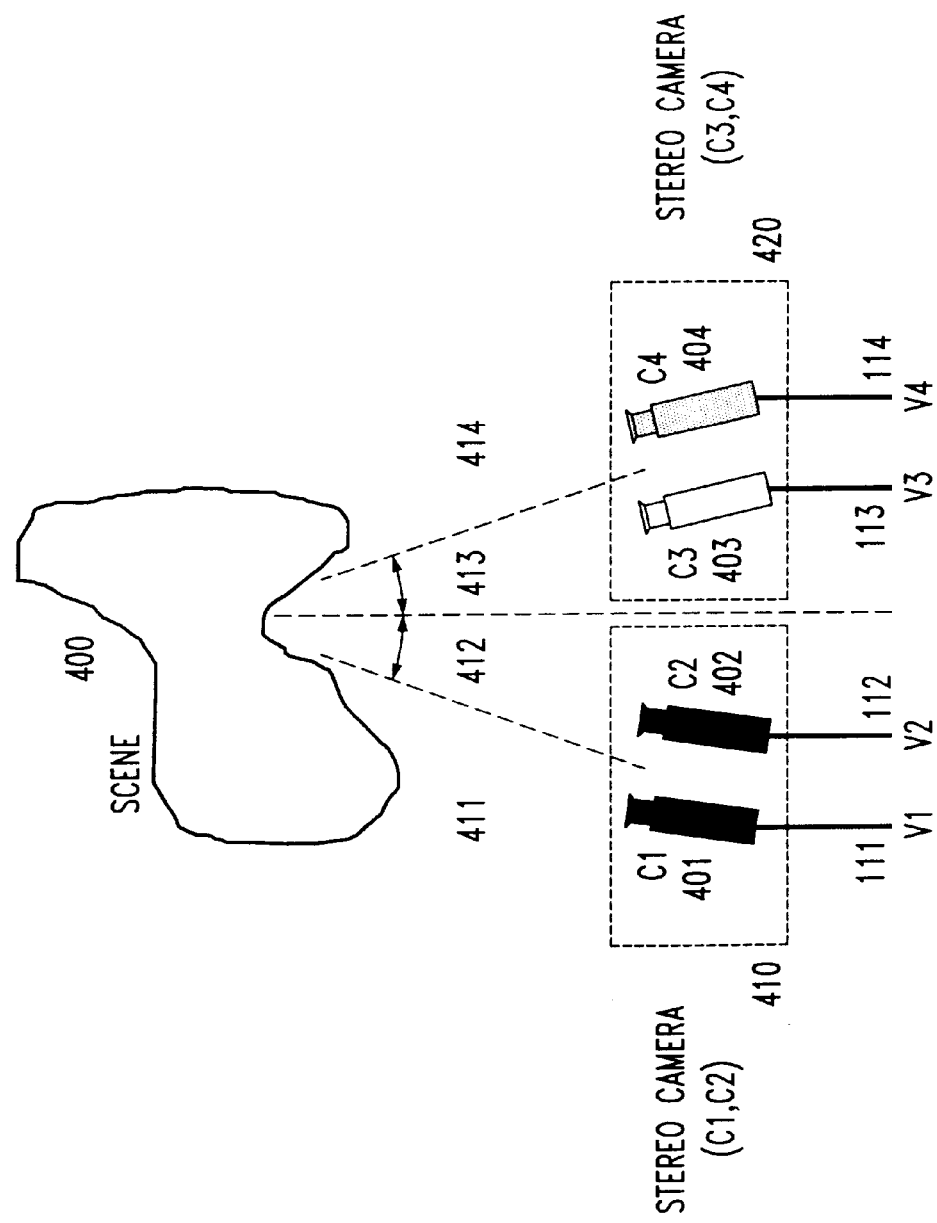
FIG. 4 shows an illustrative arrangement of multiple stereoscopic cameras for imaging a scene, in accordance with the invention.

FIG. 4 shows an arrangement of four (4) matched cameras organized as two stereoscopic cameras, 410 and 420. The cameras C1 (401), C2 (402) which belong to the same stereoscopic pair, image slightly different views 411 and 412 meant for stereoscopic display; the views captured by them are V1 and V2 and appear on lines 111 and 112 respectively. Likewise, cameras C3 (403), C4 (404) which belong to the same stereoscopic pair, image slightly different views 413 and 414 meant for stereoscopic display; the views captured by them are V3 and V4 and appear on lines 113 and 114, respectively. However, the two stereoscopic cameras 410 and 420 may be viewing very different parts of the scene 400.

Figure 5:
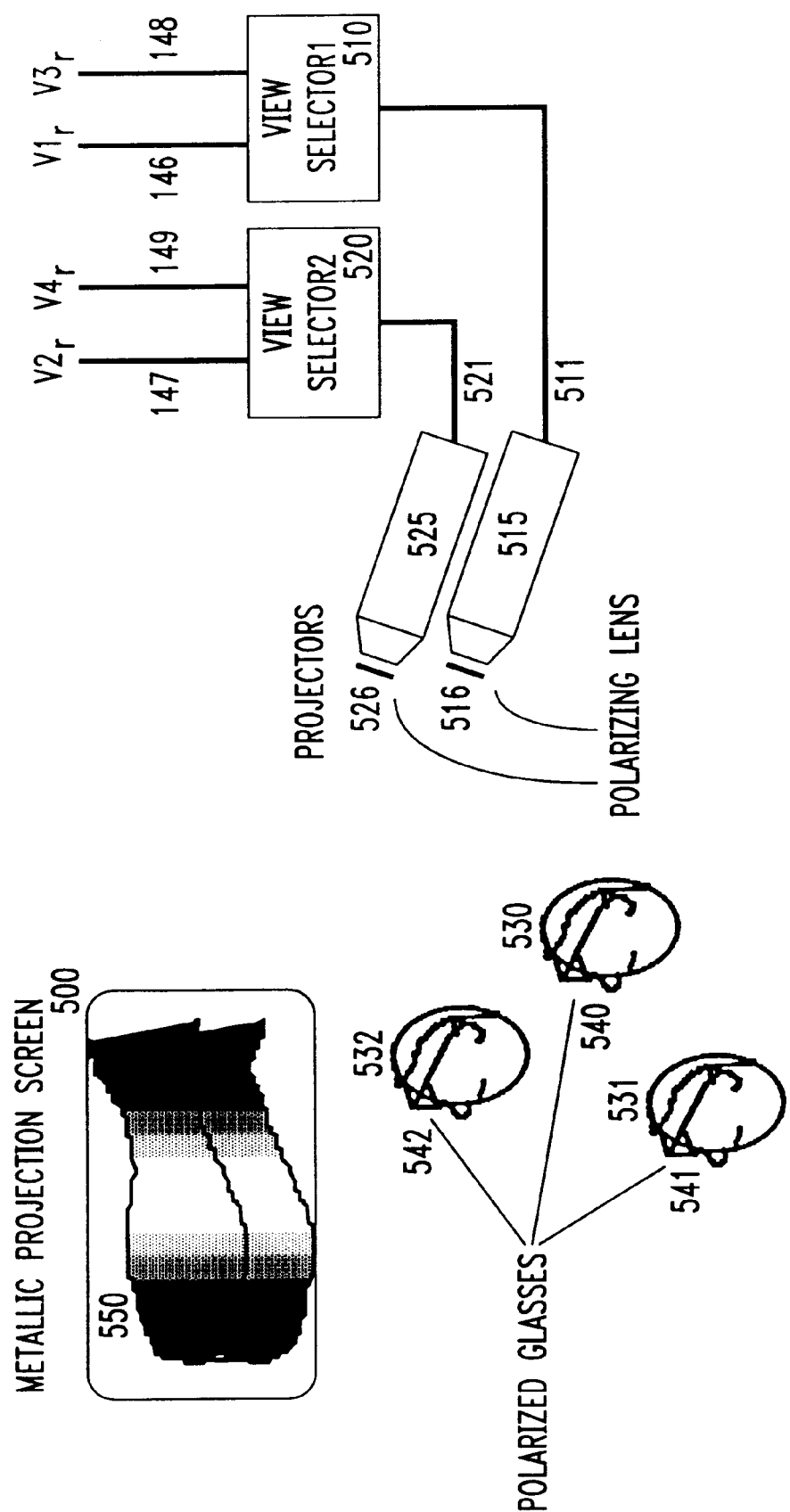
FIG. 5 shows a display arrangement for selecting one of the decoded stereoscopic views for display, in accordance with the invention.

FIG. 5 shows a simplified display arrangement for stereoscopic video in which a pair of decoded views on lines 146 and 148 are input to View Selector-1 510, and another pair of decoded views on lines 147 and 149 are input to View Selector-2, 520. The output of View Selector-1 on line 511 feeds the left view projector 515 and the output of View Selector-2 on line 521 feeds the right view projector 525. The system for display of stereoscopic video is assumed to be passive, using either a circular or linear polarizing method. In the circular polarizing method, the lens of the left projector is covered with a left circular polarizer 526 and the lens of right projector with right circular polarizer is covered with a right circular polarizer 526. Viewers 530, 531, 532 wear specialized circular polarized eyeglasses permitting only one view to each eye, the fusion of these two views being accomplished by the human brain to produce depth information necessary for 3D vision. The passive linear polarizing method is quite similar in principle to the circular polarizer system, with the main difference being that linear polarizers with orthogonal polarization directions are used to cover left and right projectors and the polarized eyeglasses also use orthogonal linear polarizers. To prevent depolarization of the light when it is reflected from the screen, a metallic screen 500 capable of preserving the polarization direction is necessary. Viewers 530, 531 and 532 wear respective polarizing glasses 540, 541 and 542 to see in 3D the scene portion 550 on screen 500. Although, a projection system using passive viewing for display is disclosed in FIG. 5, a high frame rate capable TV monitor with active shuttered viewing glasses could very well be used.

Figure 6:
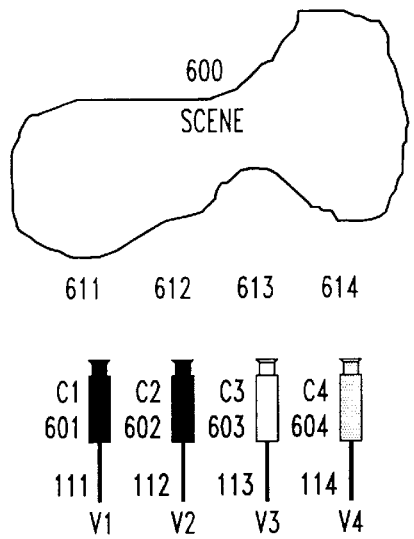
FIG. 6 shows an illustrative side-by-side arrangement of cameras with restricted spacing and orientation for imaging a scene, in accordance with the invention.

FIG. 6 shows an arrangement of 4 cameras, C1 (601), C2 (602), C3 (603) and C4 (604), in a side-by-side configuration, imaging a scene 600. Cameras 601, 602, 603 and 604 view overlapping portions 611, 612, 613 and 614 of the scene 600. The resulting four view video signals V1, V2, V3 and V4 appear on lines 111, 112, 113 and 114. The camera configuration is one-dimensional and each camera is separated by a small distance depending on the number of cameras and on the display geometry anticipated. This type of camera arrangement is intended to capture a scene from any view point such that viewing of the scene in 3D would be possible without requiring the specialized viewing glasses used in stereoscopic viewing. Each adjacent pair of cameras, C1, and C2, C2 and C3, C3 and C4, capture a stero image pair. Although, as an example, four (4) views are shown, typically eight (8) or more views may be necessary.

Figure 7:
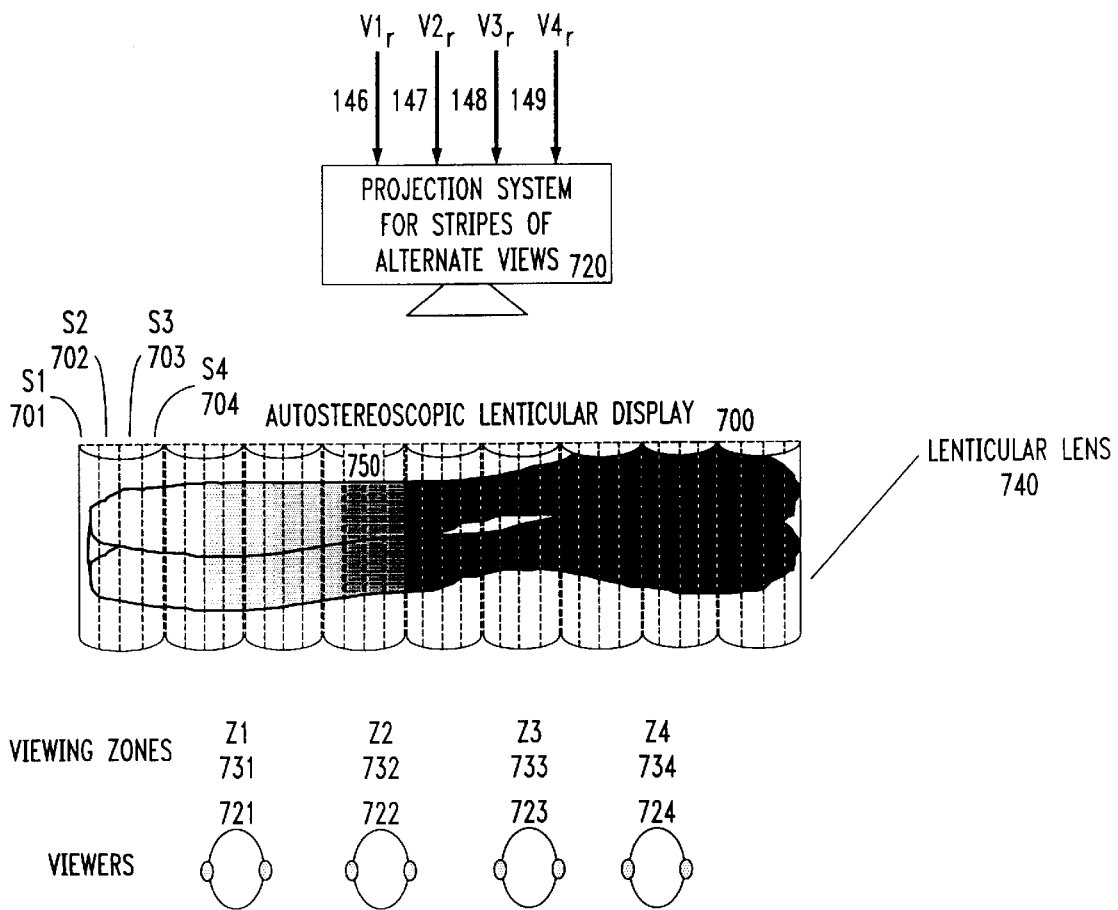
FIG. 7 shows an autostereoscopic lenticular display arrangement for showing 3D without specialized glasses.

FIG. 7 shows an autostereoscopic display configuration which permits 3D viewing without requiring viewers to wear specialized glasses. This configuration uses spatial multiplexing of stripes of views, 701, 702, 703 and 704 such that within a viewing zone the lenticular lens 740 allows only one view composed of corresponding parallel stripes equally spaced on the screen. Several viewing zones are, however, possible allowing several viewers 721, 722, 723, 724 to be located in corresponding viewing zones 731, 732, 733 and 734 to view the scene simultaneously on display 700. In this example, four decoded views appear on lines 111, 112, 113 and 114 and are input to a Projection System 720 capable of generating vertically multiplexed stripes. These spatially multiplexed stripes are projected to cover the entire display 700. Although in FIG. 7 one type of autostereoscopic system is shown, in principle the present invention applies to others as well, including ones using head tracking and projecting a view to a viewer depending on head position.

Figure 8:
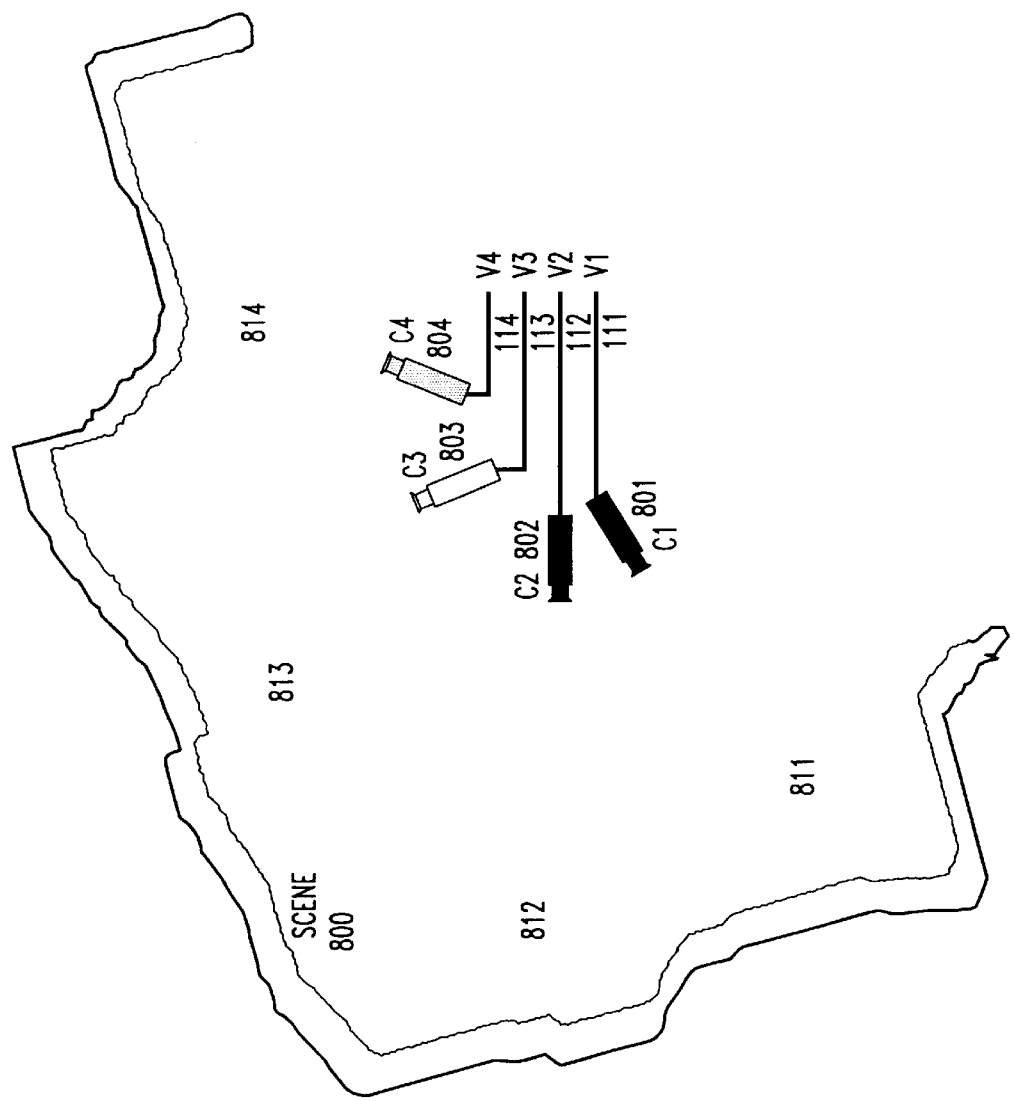
FIG. 8 shows an arrangement of cameras with their lenses in a convex configuration imaging a surrounding scene, in accordance with the invention.

FIG. 8 shows an arrangement of 4 cameras, C1 (801), C2 (802), C3 (803) and C4 (804), with their lenses in a convex configuration imaging a scene 800. Cameras, 801, 802, 803 and 804 view portions 811, 812, 813 and 814 of the entire scene 800. The resulting four view video signals V1, V2, V3 and V4 appear on lines 111, 112, 113 and 114. In this configuration, the cameras are in the middle of the scene looking outwardly, whereas the scene surrounds the cameras. In his embodiment four (4) cameras are used to partially image the entire field of vision.

Figure 9:
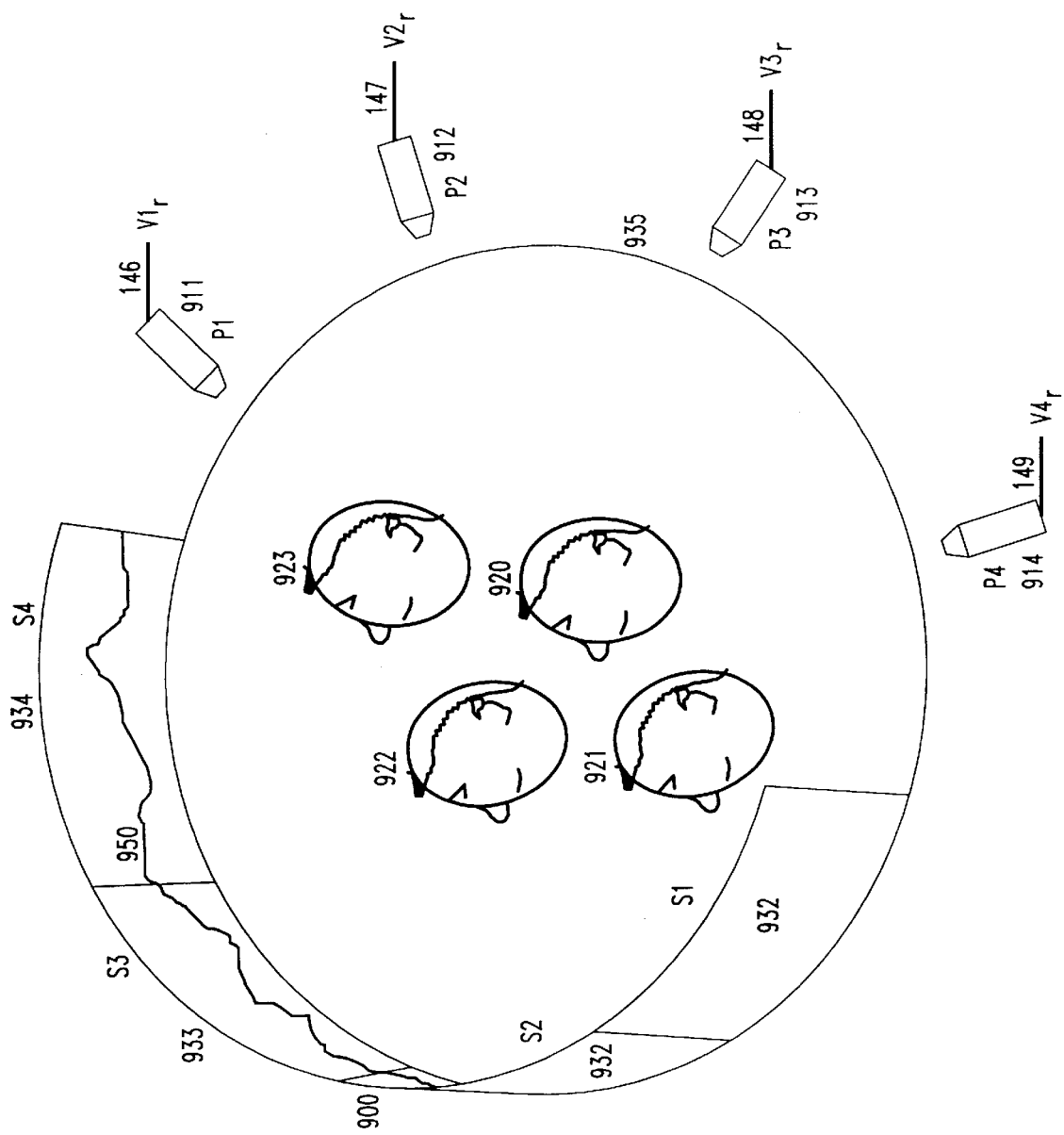
FIG. 9 shows a theater like display arrangement corresponding to the camera configuration system of FIG. 8, in accordance with the invention.

FIG. 9 shows a display system corresponding to the camera configuration system of FIG. 8. Signals representing the four decoded views are available on lines 146, 147, 148 and 149 and are input to corresponding projectors 911, 912, 913 and 914. The display 900 has 4 screens S1 (931), S2 (932), S3 (933) and S4 (934). Projectors 911, 912, 913 and 914 display on to corresponding screens 931, 932, 933 and 934 filling their field of vision with scene 950. This makes it possible to immerse viewers in the scene by providing a panoramic display surrounding them.

Figure 10:
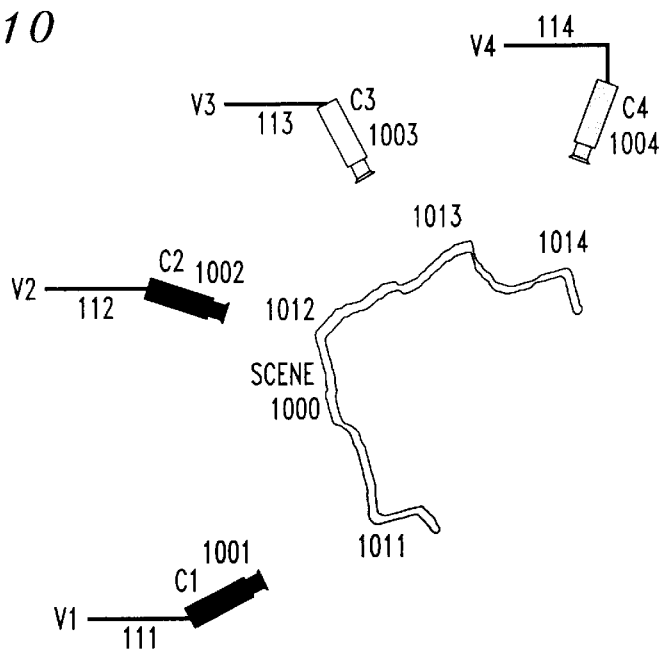
FIG. 10 shows an arrangement of cameras with their lenses in a concave configuration, surrounding a scene to be imaged, in accordance with the invention.

FIG. 10 shows an arrangement of four (4) cameras, C1 (1001), C2 (1002), C3 (1003) and C4 (1004), with their lenses in a concave configuration imaging a scene 1000. Cameras 1001, 1002, 1003 and 1004 view portions 1011, 1012, 1013 and 1014 of the entire scene 1000. The resulting four view video signals V1, V2, V3 and V4 appear on the lines 111, 112, 113 and 114. In this configuration cameras are outside of the scene looking inwardly, whereas the scene is surrounded by cameras. In this example, four (4) cameras are used to partially image the entire field of vision.

Figure 11:
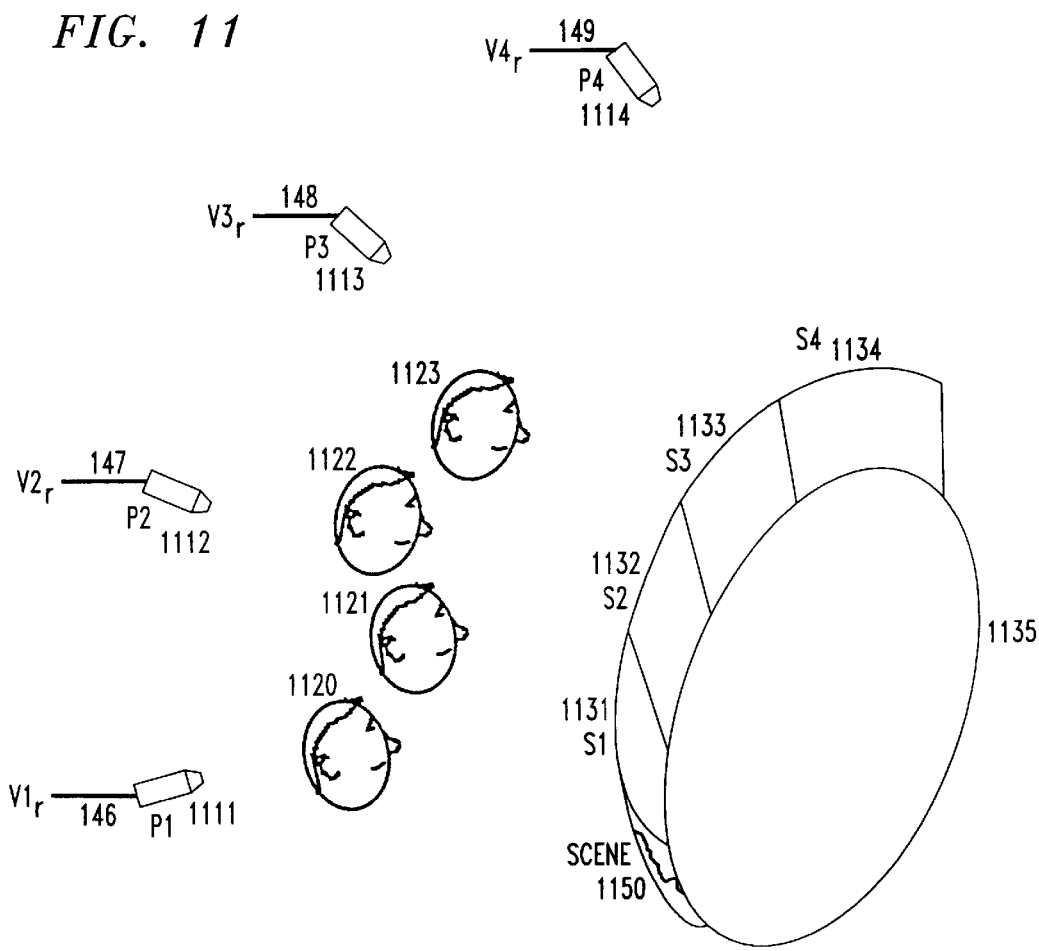
FIG. 11 shows a theater like display arrangement corresponding to the camera configuration system of FIG. 10, in accordance with the invention.

FIG. 11 shows a display system corresponding to the camera configuration system of FIG. 10. Signals representing the four decoded views are available on the lines 146, 147, 148 and 149, and are input to corresponding projectors 1111, 1112, 1113 and 1114. The display 1100 has four (4) screens S1 (1131), S2 (1132), S3 (1133) and S4 (1134). Projectors 1111, 1112, 1113 and 1114 display the images on corresponding screens 1131, 1132, 1133 and 1134 which fill their field of vision with scene 1150. This makes it possible to immerse viewers in the scene by having them surround and move around the scene.

FIGS. 12 and 13 illustrate the details of the operations performed in Spatial Views Decimater and Mux 120.

FIG. 12 provides examples of the reduction of the resolution of views 111, 112, 113 and 114 by a factor of two (2) horizontally and vertically, so that they can be multiplexed into a pair of super views. The operation of filtering before subsampling is well known in the art and is often performed in software in digital signal processors. Here, we just describe the operations involved rather than describe a specific hardwired block diagram. This decimation procedure can be performed in practice by a variety of appropriate hardware and/or software systems. For example, FIG. 12a shows that for a reduction of resolution by a factor of 2 horizontally, input frame 1200 is filtered horizontally using digital filter coefficients specified by filter 1205. Other filter Kernels may also be used. This filter can be applied horizontally on every other pixel per line and on every line of the frame, simultaneously accomplishing filtering and decimation by subsampling. The horizontally decimated and filtered output is frame 1210. FIG. 12b frame shows the process of reduction of resolution by a factor of two (2) vertically for an interlaced signal. Every other line of the interlaced frame 1220 is dropped. This results in progressive frame 1230 with half the vertical resolution of the input. FIG. 12c shows an identical operation for halving of the vertical resolution by dropping the second field of frame 1240, which happens to be of half resolution horizontally. The output is a progressive frame of half vertical and horizontal resolution as shown in 1250.

FIG. 12d shows the process of reduction of vertical resolution by a factor of 2 vertically for progressive frame 1260. In this case, every other corresponding pixel of every other line is vertically filtered using filter 1265, or any other suitable filter resulting in simultaneous filtering as well as reduction of resolution by a factor of two vertically. FIG. 12e shows an identical operation of reduction of vertical resolution by a factor of 2 vertically on a progressive frame, except that the frame is of half horizontal resolution like frame 1210. Input frame 1280 is decimated by a factor of two vertically using filter 1285 resulting in output frame 1290. The operations shown in FIGS. 12d and 12e may be performed simultaneously using a two dimensional filter kernel.

Figures 13A, 13B, 13C, 13D, 13E, 13F:
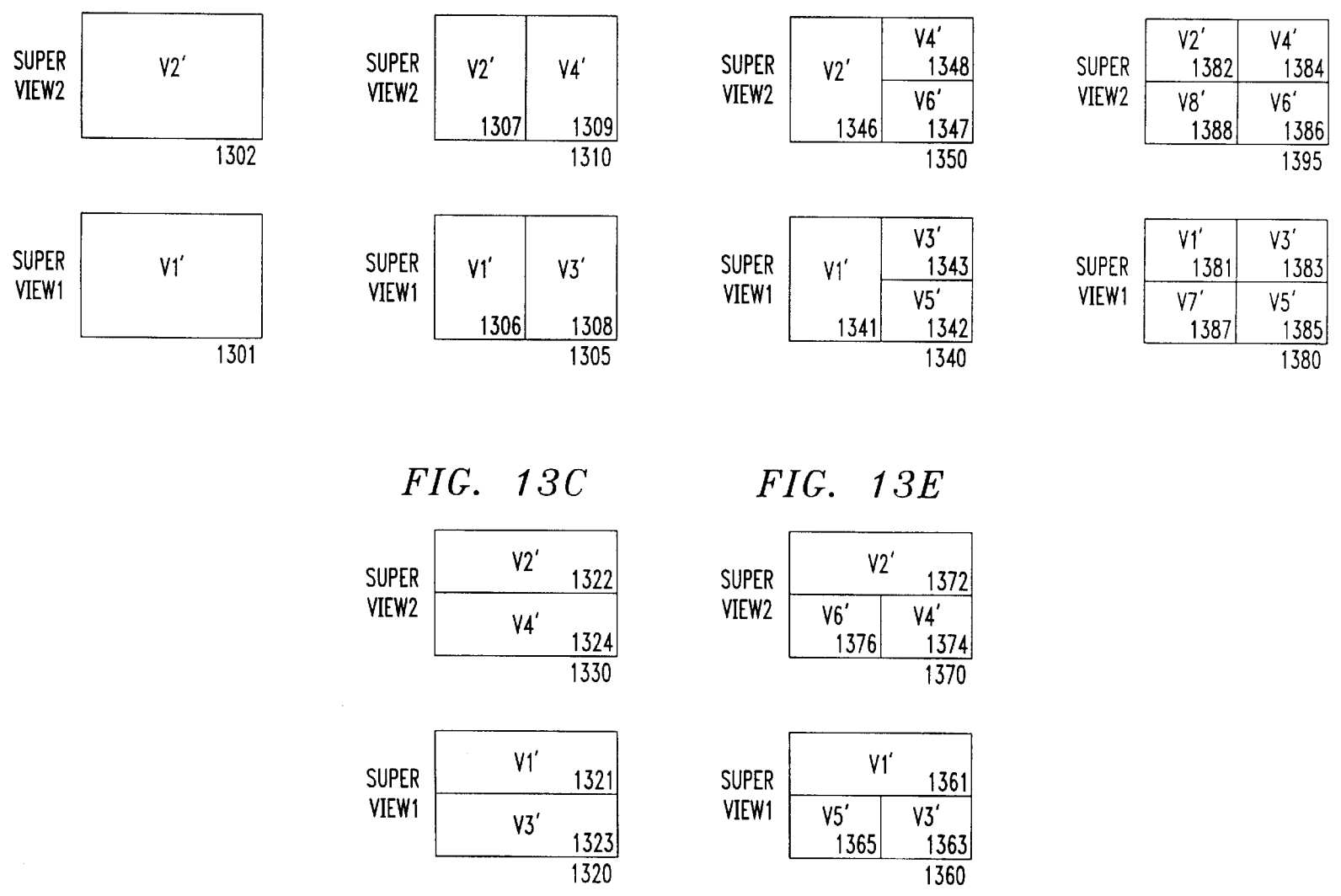

FIG. 13 shows several ways of multiplexing views of reduced resolution so as to form a pair of super views. For example, in FIG. 13a, since only two views are available, they can be kept to full resolution such that super-view 1 is simply view 1, 1301, and super-view 2 is a view 2 (1302). FIG. 13b shows a total of four (4) views, such that each super-view comprises two half horizontal resolution views multiplexed side-by-side. Super-view 1, 1305, comprises horizontally reduced resolution views V1' (1306) and V3' (1308), while super-view 2 (1310) comprises horizontally reduced resolution views V2' (1307) and V3' (1309). FIG. 13c also shows a total of four (4) views, however, each super-view has half vertical resolution views multiplexed in top-and-bottom format. Super-view 1, 1320, has vertically reduced resolution views V1' (1321) and V3' (1323), while super-view 2, 1330 comprises vertically reduced resolution views V2' (1322) and V4' (1324).

FIG. 13d shows a total of six (6) views, two (2) views of half horizontal resolution, and remaining four (4) views of half horizontal as well as half vertical resolution. Super-view 1, 1340 includes horizontally reduced resolution view V1' (1341) and horizontally and vertically reduced resolution views V3' (1343) and V5' (1345), while super-view 2, 1350 includes horizontally reduced resolution view V2' (1346) and horizontally and vertically reduced resolution views V4' (1348) and V6' (1347). FIG. 13e also shows a total of six (6) views, two (2) views of half vertical resolution, and the remaining four (4) views of half horizontal as well as half vertical resolution. Super-view 1, 1360, includes vertically reduced resolution view V1' (1361) and horizontally and vertically reduced resolution views V3' (1363) and V5' (1365), while super-view 2, 1370 includes vertically reduced resolution view V2' (1372) and horizontally and vertically reduced resolution views V4' (1374) and V6' (1376). FIG. 13f shows a total of eight (8) views, each including half horizontal and half vertical resolution views multiplexed to form two super-views. Super-view 1, 1380, includes both horizontally and vertically reduced views V1' (1381), V3' (1383), V5' (1385) and V7' (1387), while super-view 2, 1390, includes both horizontally and vertically reduced views V2' (1382), V4' (1384), V6' (1386) and V8' (1388). If a total number of views to be multiplexed is not even, but still lies in the range of 2 to 8, then the solution for the next even number of views can be chosen and some views may not use any prediction. The technique presented here can be easily extended to deal with a case of more than 8 total views.

Figure 15:
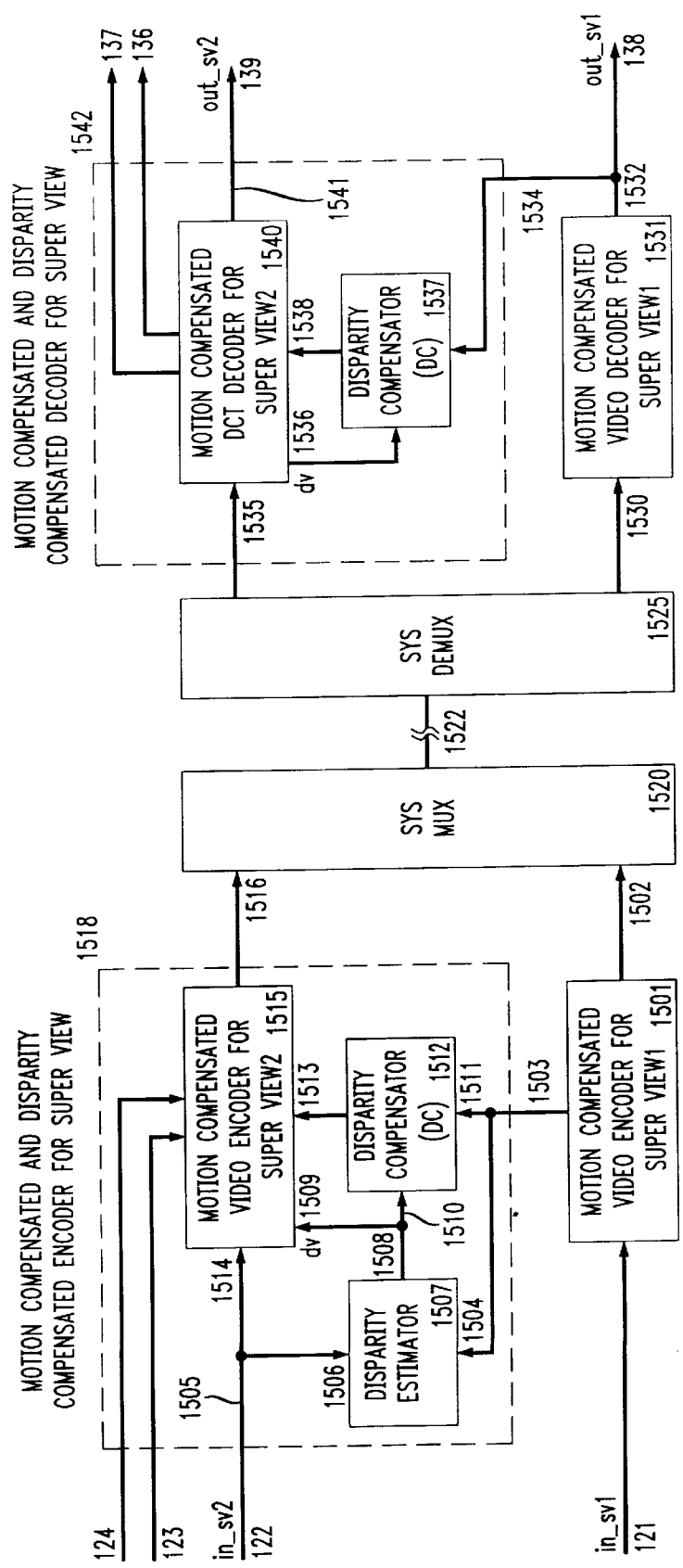
FIG. 15 shows an illustrative and generalized block diagram of a multi-view coding, in accordance with the invention.
Figure 16:
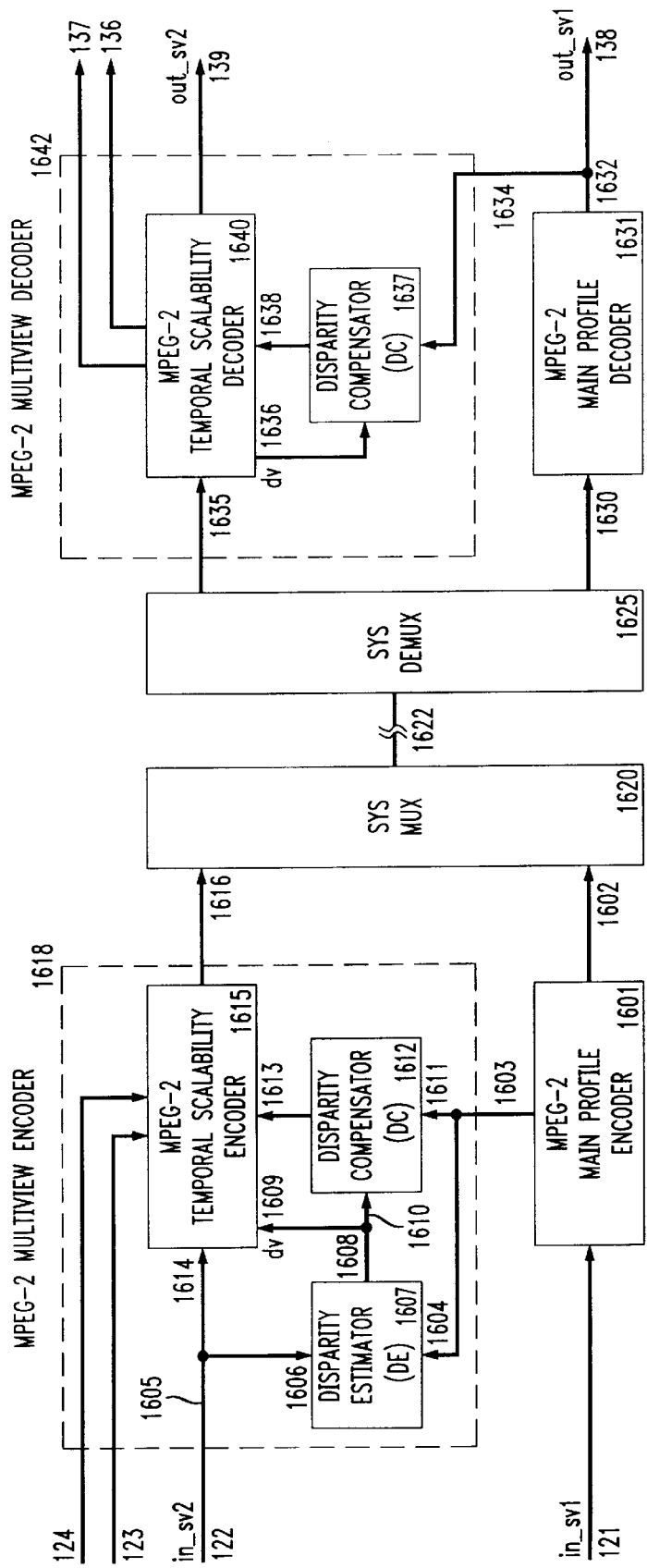
FIG. 16 shows a block diagram showing a specific realization of a multi-view coding, in accordance with the invention.

FIG. 15 and 16 illustrate the high level of codec between structures for accomplishing the functionality of Encoder 130 and the corresponding Decoder 135 of FIG. 1.

FIG. 15 shows a high level block diagram of a Super-View Pair video codec of our present invention. A super-view pair is composed of a super view 1 signal 121 and a super-view 2 signal 122. Super-view 1 signal 121 has been selected to be coded independently, whereas the super-view 2 signal 122 is coded with respect to the locally decoded super-view 1 signal. This choice is somewhat arbitrary. As shown in FIG. 15, the super-view 1 signal on line 121 is input to super-view 1 encoder 1501, which we assume to be a motion compensated video encoder which outputs a coded bitstream on line 1502 and reconstructed frames on line 1503. The super-view 2 signal is input on line 122 and applied to input 1506 of disparity estimator 1507, which estimates disparity vectors between input frames on input 1506 with respect to the locally decoded super-view 1 signal applied to input 1504. The estimation of disparity vectors could very well be performed between original frames of super-view 2 signal applied to input 1506 and original frames of the super-view 1 signal on line 121.

These disparity vectors appear on line 1508 and are applied to disparity compensator 1512 and are also sent on to input 1509 of super-view 2 encoder 1515. The disparity compensator 1512 uses the locally decoded super-view 1 signal at its input 1511 and disparity vectors at its input 1510 to generate a disparity compensated prediction signal at input 1513 of super-view 2 encoder 1515.

The bitstream output from super-view 2 encoder is output on line 1516 and the bitstream of super-view 1 encoder is output on line 1502. These bitstreams are multiplexed in system multiplexer, 1520 for transmission or storage over channel 1522.

At the decoder, System Demultiplexer ("Sys Demux") 1525 identifies the super-view 1 and super-view 2 portions of the bitstream and inputs them to corresponding decoders 1531 and 1540 via lines 1530 and 1535, respectively. The decoded super-view 1 output is available to disparity compensator 1537 which uses decoded disparity vectors to generate disparity compensated prediction signal on line 1538 for use by super-view 2 decoder 1540. The super-view 1 and super-view 2 decoded signals are available on lines 1532 and 1541. The disparity compensator, 1537 is exactly identical to the disparity compensator, 1512, at the encoder. An example of a disparity estimator and compensator is a block matching motion estimator and compensator with certain restrictions. Also, in general in the coding of FIG. 15, not only is the possibility of using two disparity compensated predictions allowed, but also, one disparity and one motion compensated prediction. This is similar to configurations for efficient compression of stereoscopic signals as described in the above-identified copending patent applications of Haskell et al. Thus, super-view 2 coding can use disparity compensation with respect to decoded super-view 1 as well as motion compensation with respect to its own previous decoded frame. This signal is generated internally at the encoder 1515, and decoder 1540. As a final note, super-view 2 encoder 1515, also includes information regarding multiplexing of the views, 124, and view capture information 123, as part of the super-view 2 bitstream. Super-view 2 decoder 1540 decodes and outputs information regarding multiplexing of views on line 137 and information about the view capture arrangement on line 136.

FIG. 16 shows a specific embodiment of the generalized codec structure of FIG. 15. It uses MPEG-2 standard based nonscalable encoding and decoding composed of motion-compensated DCT coding, as well as temporal scalability coding, which in addition, allows motion compensated prediction between two layers. More specifically, an MPEG-2 Main Profile Encoder, 1601, is employed to encode super-view 1 and the corresponding bitstream is decoded by an MPEG-2 Main Profile Decoder 1631. For encoding of super-view 2, a modified MPEG-2 Temporal Scalability Encoder 1615 is used in conjunction with a Block Disparity Estimator 1607 and a Block Disparity Compensator 1612. The super-view 2 bitstream is decoded by a corresponding modified MPEG-2 Temporal Scalability Decoder 1640, which uses a Block Disparity Compensator 1637. The operation of Block Disparity Estimator 1607 and Block Disparity Compensators 1612 and 1637 is similar to block matching motion estimators and compensators as set forth in Test Model Editing Committee, "*MPEG-2 Video Test Model 5*", IS/IEC JTC1/SC29/WG11 Doc. N0400, April 1993 and A. Puri, "*Video Coding Using the MPEG-2 Compression Sheet*", Proceedings of SPIE Visual Communications and Image Processing, Boston, Mass., November 1993, pp. 1701–1713, which is incorporated herein by reference, except that for disparity estimation, a very large horizontal range but rather a small vertical range is used. When coding a super-view using prediction from an independently coded super-view, the modified MPEG-2 Temporal Scalability Encoder 1601 with the Block Disparity Estimator 1607 and Block Disparity Compensator 1612 is referred to as an MPEG-2 Multi View Encoder 1618. The corresponding decoder is referred to as an MPEG-2 Multi View Decoder 1642. In terms of high-level operation, the coding of FIG. 16 operates exactly similar to the coding of FIG. 15 and is repeated here for the sake of clarity.

The super-view 1 signal on line 121 is input to Encoder 1601 and outputs a coded bitstream on line 1602 and reconstructed frames on line 1603. The super-view 2 signal is input on line 122 and applied to Disparity Estimator 1607, which estimates disparity vectors between input frames on line 1606 with respect to the locally decoded super-view 1 signal from line 1603 at input 1604. The estimation of disparity vectors could very well be performed between the original frames of the super-view 2 signal on line 1606 and the original frames of the super-view 1 signal on line 121. These disparity vectors are output from Estimator 1607 on line 1608 and are applied to Disparity Compensator 1612. They are also sent to input 1609 of the super-view 2 Encoder 1615. The Disparity Compensator 1612 uses the locally decoded super-view 1 signal on line 1603 at input 1611 and disparity vectors on line 1608 at input 1610 to generate disparity compensated prediction signals on line 1613.

The bitstream output from super-view 2 encoder on line 1616 and the bitstream of super-view 1 encoder on line 1602 are multiplexed in Sys Mux 1620 for transmission or storage over channel 1622. At the decoder, Sys Demux 1625 identifies the super-view 1 and super-view 2 portions of the bitstreams and inputs them to corresponding decoders 1631 and 1640 via lines 1630 and 1635, respectively. The decoded super-view 1 output is available to Disparity Compensator 1637, which uses decoded disparity vectors to generate disparity compensated prediction signals on line 1638 for use by super-view 2 Decoder 1640. The super-view 1 and super-view 2 decoded signals are available on lines 1633 and 1641. The Disparity Compensator, 1637 is exactly identical to the Disparity Compensator 1612 at the encoder.

In the generalized coding of FIG. 16, not only is the possibility of using two disparity compensated predictions allowed, but also, one disparity and one motion compensated prediction. This is similar to configurations for efficient compression of stereoscopic signals as noted in the copending applications Haskell et al. Thus, the super-view 2 encoder/decoder can use disparity compensation with respect to the decoded super-view 1 as well as motion compensation with respect to its own previous decoded frame. This signal is generated internally at the Encoder 1615 and Decoder 1640.

Also, super-view 2 Encoder 1615 includes information regarding multiplexing of views 124 and view capture information 123 as part of the super-view 2 bitstream. Super-view 2 decoder 1540 decodes and outputs information regarding multiplexing of the views on line 137 and information about the view capture arrangement on line 136.

FIG. 14 illustrates details of the inverse operations performed in DeMux Views and Spatial Interpolator 145. In FIG. 14 there are provided examples of the interpolation of each of the views extracted by demultiplexing of the super-views on lines 138 and 139 of FIG. 1. Interpolation is performed so as to result in upsampled views of full resolution on lines 146, 147, 148 and 149. As discussed during explanation of FIG. 13, the reduced resolution views may have undergone reduction in resolution horizontally, vertically or both, and thus, the interpolation process is intended to upsample to twice the pixel resolution, horizontally, vertically or both. The process of interpolation is well known to those skilled in the art and is often performed on general purpose digital signal processors.

Figure 14A:
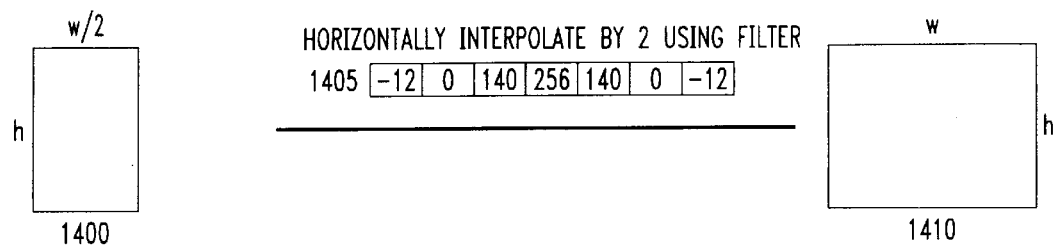
FIG. 14a through 14c show examples of interpolation operation for upsampling to full spatial resolution after decoding of views.
Figure 14B:
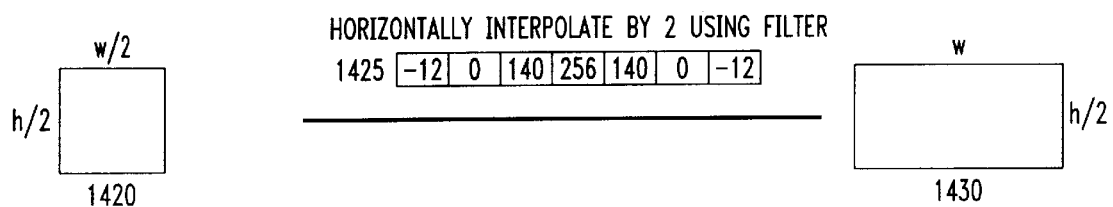
Figure 14C:
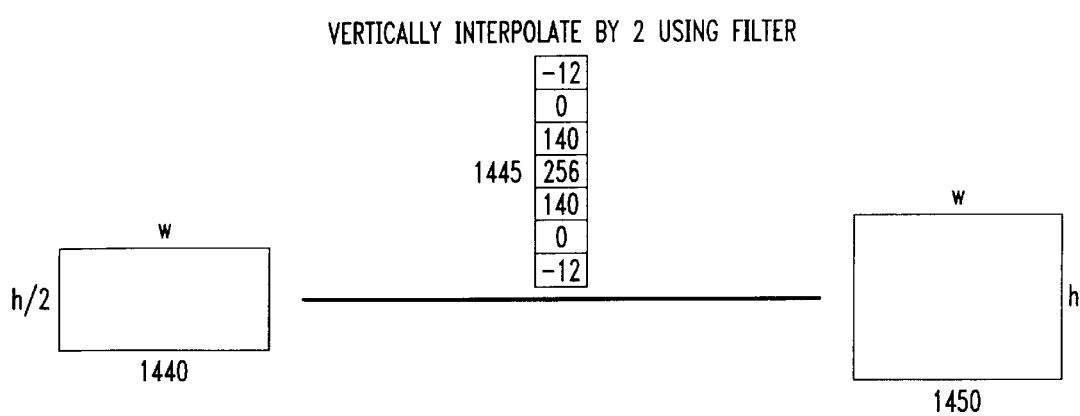

The interpolation process involves generating samples in intermediate locations between existing samples, by applying an interpolation filter. The output of the interpolation filter appears at the coefficient with unit weight (256/256) and its value is assigned to the missing sample at the intermediate location. The filters preferred are the ones specified for post processing in MPEG-2 Video Test model 5 which were found to give superior results. Test Model Editing Committee, IS/IEC JTC1/SC29/WG11 Doc. N0400, April 1993. In FIG. 14a a, frame of half horizontal resolution 1400, is upsampled horizontally by a factor of two by interpolation filter 1405 to yield frame 1410. In FIG. 14b, a frame 1420 of half horizontal resolution and half vertical resolution is upsampled by a factor of two by using interpolation filter 1425 to full horizontal resolution frame 1430. In FIG. 14c, a frame 1440 of half vertical resolution is vertically interpolated by filter 1445 to a full vertical resolution frame 1450. The information regarding whether a given view has to be interpolated horizontally or vertically is derived from view mux pattern signal 137 decoded by decoder 136 and applied to DeMux Views and Spatial Interpolator 145 on line 140.

Figure 17:
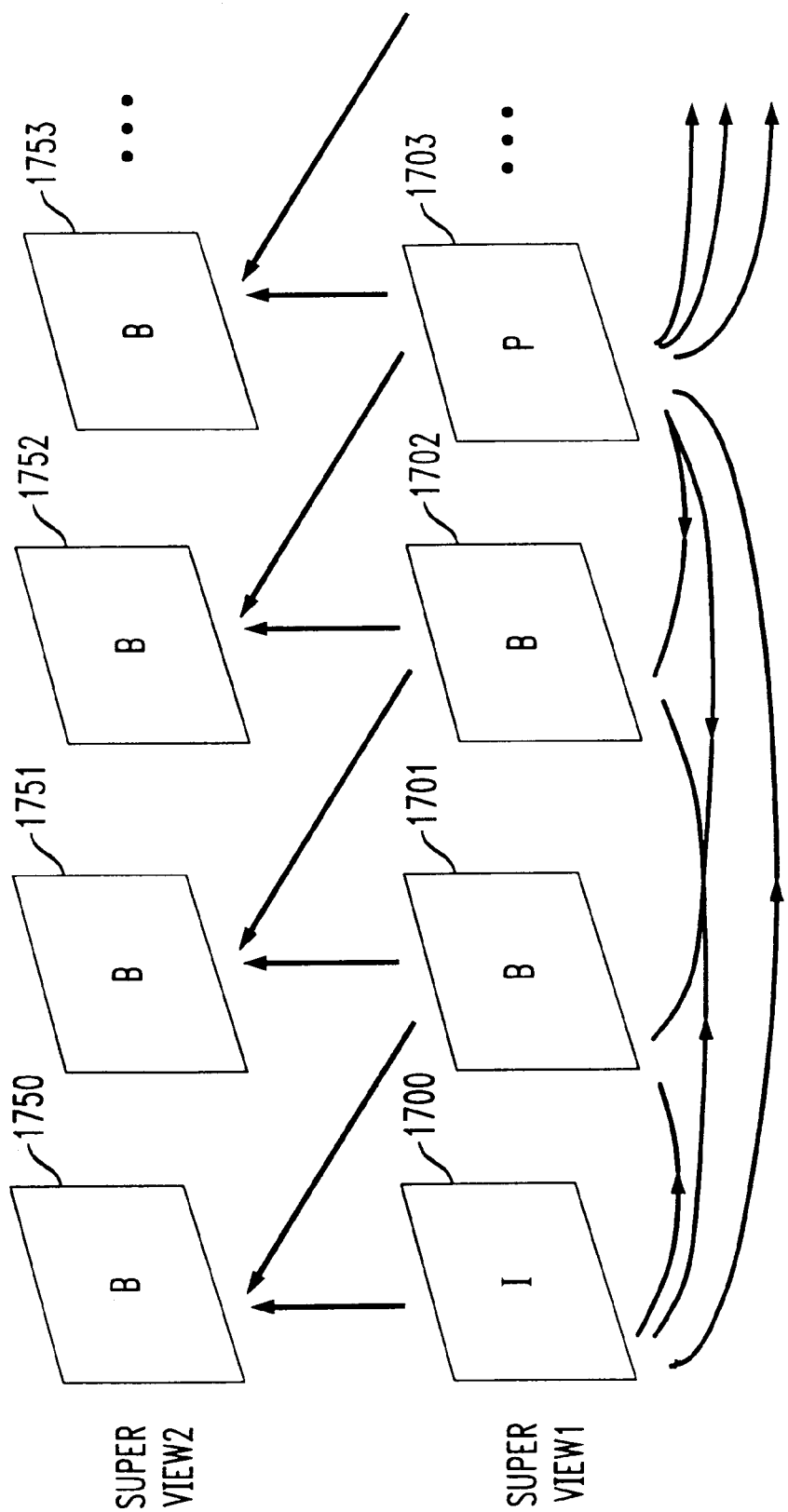
FIG. 17 shows picture structure 1 that uses two disparities compensation for coding of multi-view video arranged as super-views, in accordance with the invention.

FIG. 17 shows an exemplary prediction structure for coding of a pair of super-view video signals according to principles of our invention, which is based on the MPEG temporal prediction structure. The super-view 1 includes frames 1700, 1701, 1702, 1703 etc, and are coded with MPEG-1 or nonscalable MPEG-2 video coding. When using MPEG-2 video coding, it is assumed that frame pictures are used (although field picture coding could also be used).

Three types of pictures are defined in MPEG: i.e., ("I") pictures, predicted ("P") pictures, and bidirectionally interpolated ("B") pictures. I pictures provide access points for random access. P pictures are coded with reference to a previous picture, which can be either an I or P pictures. B pictures are coded with reference to a previous or future picture or both, which can be I or P pictures.

Super-view 1 is input to an MPEG encoder which uses a constant value of M=3. This value represents the prediction distance between a pair of consecutive anchor frames, where an anchor frame can be a P or an I frame. The number of B pictures between anchor frames is simply M-1. Since B pictures are noncausal, the order of input frames is required to be reorganized for coding, since coding order is different from input or display order. For example, in the coding of super-view 1, MPEG standard coding with M-3 requires that frame 1700 be coded first by itself, followed by codex of frame 1703, which is coded with respect to frame 1700, followed by codex of frames 1701 and 1702 using decoded frames 1700 and 1703, and the process repeats. This type of codex is known. See, generally, Arun Netravali and Barry Haskell, Digital Pictures: Representation, Compression, and Standards (Plenum Press, 2nd ed. 1995). The super-view 2 is input to an MPEG-2 temporal scalability-like encoder and comprises a sequence of incoming frames 1750, 1751, 1752, . . . etc, which are coded with respect to decoded frames of super-view 1. In this illustrative example, only B picture coding of super-view 2 frames are utilized, each of which use pairs of decoded frames of super-view 1 as anchors. Although B pictures are used, no reordering of super-view 2 frames is necessary, as these B pictures use different semantics as compared to B pictures used in coding of super-view 1. The prediction structure employed here involves prediction of each B picture of super-view 2 using a temporally coincident and temporally adjacent frame from decoded super-view 1. Note that due to the aforementioned need for frame ordering in coding of super-view 1, frame 1701 is only coded after frame 1703 has been coded. The next super-view 2 frame to be coded is 1751 and requires decoded frames 1701 and 1702 from super-view 1 for prediction. Again, note that due to frame ordering for codex of super-view 1, 1702 is coded after 1701 which is coded after 1703. Since the coder progresses in this manner, an initial delay for coding of the super-view 2 signal is required to ensure that appropriate super-view 1 frames are available when needed. In the copending applications of Haskell et al., there is described coding of stereoscopic video composed of a left view and a right view by means of an encoder and decoder that employs two disparity predictions. The present invention employs the same encoder and decoder structure. The main difference is that two super-views are employed, each composed of several reduced resolution views, rather than a left and right view.

Figure 18:
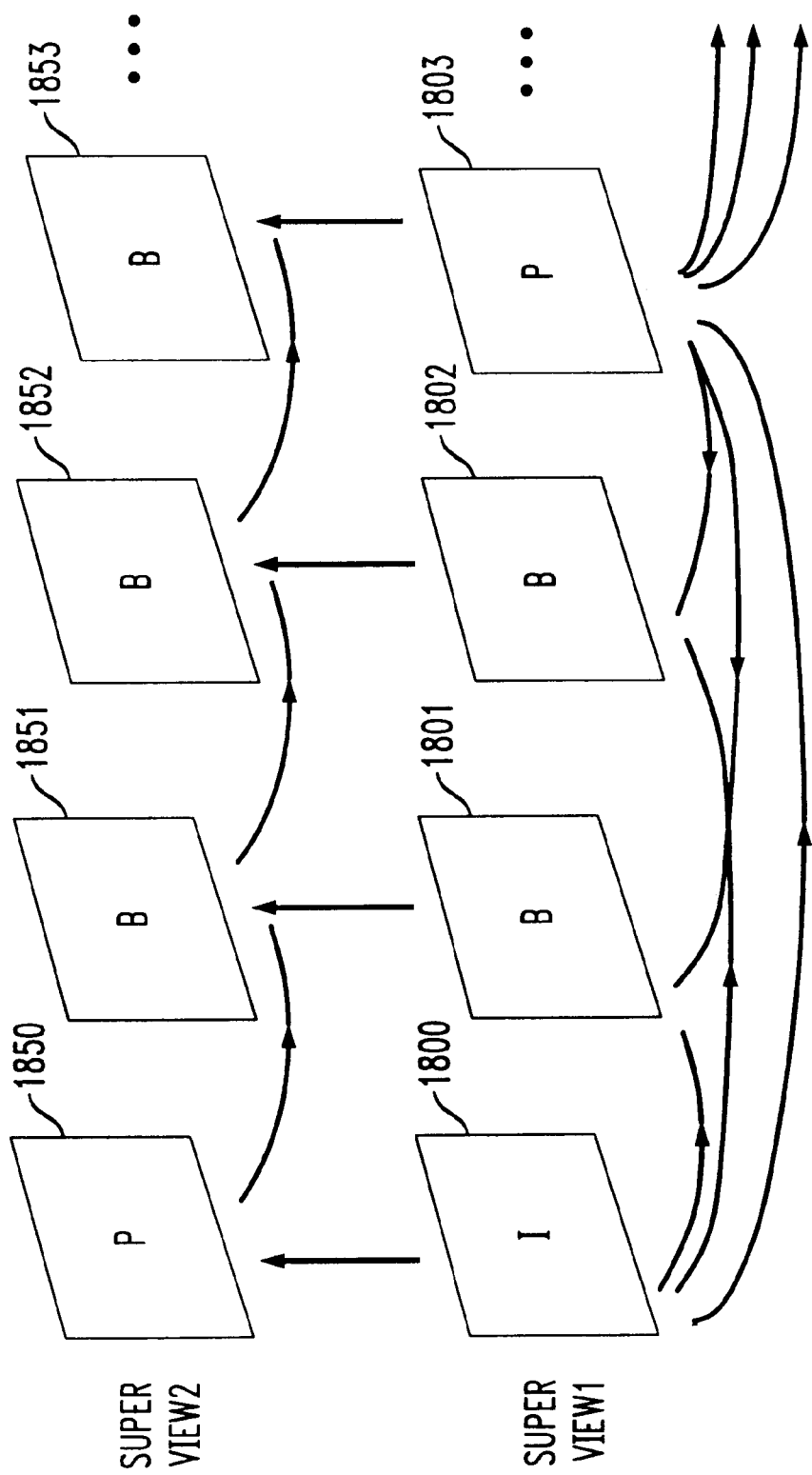
FIG. 18 shows picture structure 2 that uses motion and disparity compensation for coding of multi-view video arranges as super-views, in accordance with the invention.

FIG. 18 shows another example of the prediction structure for coding of multi-view video using the principles of our invention. The super-view 1 has a sequence of frames 1800, 1801, 1802, 1803, . . . etc, which are coded with an MPEG-1 or nonscalable MPEG-2 video coder. When using an MPEG-2 coder, the discussion is restricted to frame pictures only, although the principles of the present invention can be easily applied with field pictures as well. As mentioned earlier, super-view 1 is input to an MPEG encoder, which is assumed to use B pictures and, in particular, for discussion purposes, a constant distance of M=3 between anchor frames which are either I or P frames separated by M-1 B frames. Further, due to the noncausal nature of B frames, the order of input frames needs to be reorganized for coding, and is different from that of the input or the display order. For example, when coding according to MPEG, M=3 requires that frame 1800 be coded by itself, followed by frame 1803 which is coded with respect to decoded frame 1800, followed by frames 1801 and 1802 using decoded frames 1800 and 1803. The process then repeats. This type of coding is known. The super-view 2 is input to an MPEG-2 temporal scalability-like encoder and has a sequence of frames 1850, 1851, 1852, . . . , etc, which are coded with respect to decoded super-view 1 frames. With the exception of the first frame of super-view 2, which is a P picture, we employ only B picture coding of super-view 2 frames, each of which use two predictions; first, a prediction from the immediately previous decoded frame of super-view 2, and second, a prediction from a decoded frame temporally coincident in the super-view 1. Although we use B frames, no reordering of super-view 2 frames is necessary, as these B frames have different semantics as compared to those used in codex of super-view 1.

The prediction structure for super-view 2 requires that frame 1850 be coded as a P frame and use the decoded frame 1800 for prediction. The next super-view 2 frame is 1851 and uses decoded super-view 2 frame 1850 and decoded super-view 1 frame 1801 for prediction. However, due to the need for reordering of the frames when B frames are used, decoded frame 1801 is only available after frames 1800 and 1803 are coded, this is the cause of delay between super-view 1 and super-view 2.

Next, frame 1852 of super-view 2 is coded and uses previously decoded frame 1851 and decoded frame 1802. Incidently, frame 1802 is coded after the coding of frame 1801, which is coded after coding of 1803. The coding progresses in this manner and thus results in an initial delay. In the copending Haskell et al. applications, there is already described encoding and decoding of stereoscopic video composed of a left view and a right view by means of an encoder and decoder that employ one disparity and one motion prediction. Here, our invention employs the same encoder and decoder structure, the main difference being that two super-views are coded, each composed of several reduced resolution views.

Figure 19:
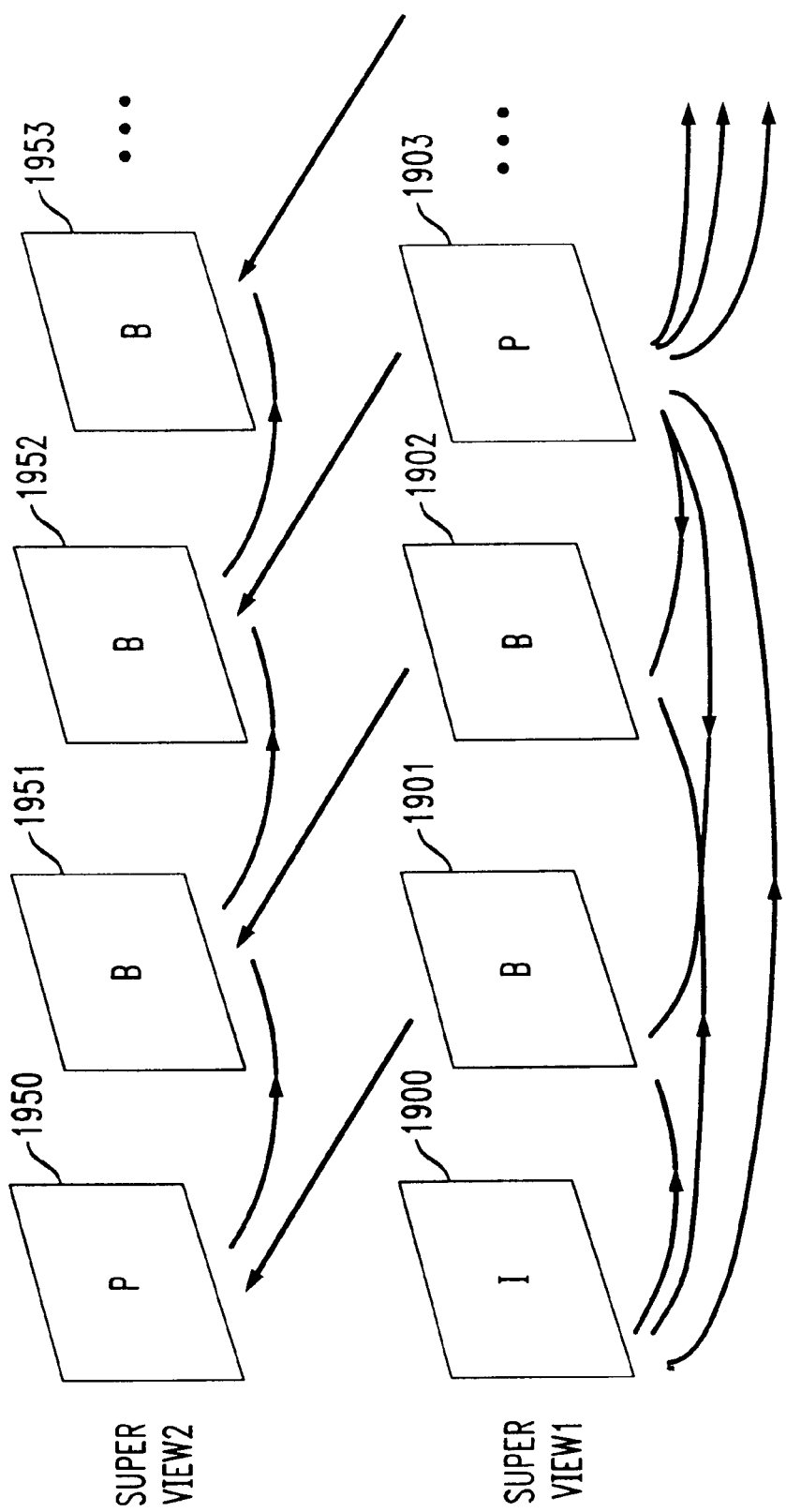
FIG. 19 shows an alternate picture structure 2 that uses motion and disparity compensation for coding of multi-view video arranged as super-views, in accordance with the invention.

FIG. 19 shows yet another example of a prediction structure for coding of stereoscopic video using the principles of the present invention. This structure is related to the structure in FIG. 18. The super-view 1 includes frames 1900, 1901, 1092, 1903, . . . etc, which are coded with MPEG-1 or nonscalable MPEG-2 video coding. When using MPEG-2 coding, the discussion is restricted to frame pictures only, although the principles of the present invention can be easily applied with field pictures as well. As mentioned earlier, super-view 1 is input to an MPEG encoder, which is assumed to use B pictures and in particular, for discussion purposes, a constant distance of M=3 between anchor frames which are either I or P frames separated by M-1 B frames. Further, due to the noncausal nature of the B frames, the order of input frames needs to be reorganized for coding, and is different from that of the input or the display order. For example, in a codex according to MPEG, M=3 requires that frame 1900 be coded by itself, followed by frame 1903 which is coded with respect to decoded frame 1900, followed by frames 1901 and 1902 using decoded frames 1900 and 1903. The process then repeats. This type of codex is also known. The super-view is input to an MPEG-2 temporal scalability-like encoder and includes a sequence of frames 1950, 1951, 1952, . . . , etc, which are coded with respect to decoded super-view 1 frames. With the exception of the first frame of super-view 2, which is a P picture, only B picture coding of super-view 2 frames is employed, each of which use two predictions, first, a prediction from the immediately previous frame of super-view 2, and second a prediction from a decoded frame of super-view 1 temporally next to the coincident frame. Although B pictures are used, no reordering of super-view 2 frames is necessary, as these B pictures use different semantics as compared to B pictures used in the coding of super-view 1.

The prediction structure for super-view 2 requires that frame 1950 be coded as a P frame and uses decoded frame 1901 for prediction. The next super-view 2 frame is 1951 and uses decoded super-view 2 frame 1950 and decoded super-view 1 frame 1902 for prediction. However, due to the need to record frames when B frames are used, decoded frame 1902 is only available after frames 1900, 1903 and 1901 are coded, and this causes some initial delay. Next, frame 1952 of super-view 2 is coded and uses previously decoded frame 1951 and decoded frame 1903 for prediction. The coding progresses in this manner, which results in an initial delay for coding of super-view 2 to ensure that the appropriate super-view 1 frame is available when needed. This delay is one frame longer than the delay by the prediction structure of FIG. 18. In the copending Haskell et al. applications, we have already described encoding and decoding of stereoscopic video composed of a left view and a right view by means of an encoder and decoder that employs one disparity and one motion prediction. Here, we employ the same encoder and decoder structure, the main difference being that two super-views, each composed of several reduced resolution views are coded.

While the invention has been particularly shown and described with reference to preferred embodiments thereof, it will be understood by those skilled in the art that various changes in form and details may be made therein without departing from the spirit and scope of the invention.

We claim:

1. A system, for coding and decoding multiple simultaneous scene signals representing multiple different views of a scene obtained from a camera arrangement, comprising:

a spatial view multiplexer which combines more than two scene signals into super-view 1 and super-view 2 signals and generates an arrangement data signal indicating a particular multiplex arrangement and order of said more than two scene signals in said super-view 1 and super-view 2 signals;

an encoder and system multiplexer assembly which receives said super-view 1 and super-view 2 signals and said arrangement data signal, encodes said super-view 1 and super-view 2 signals using compression based on redundancies between the two super-views to produce encoded super-view 1 and encoded super-view 2 signals, and combines said encoded super-view 1 signal, said encoded super-view 2 signal, and said arrangement data signal into a multiplexed data stream;

a transmission channel for transmitting said multiplexed data stream;

a decoder and system demultiplexer assembly which receives said multiplexed data stream, separates said encoded super-view 1 signal, said encoded super-view 2 signal, and said arrangement data signal from the multiplexed data stream, and operates on said encoded super-view 1 and super-view 2 signals to decode them according an inverse operation of the encoding in said encoder to produce decoded super-view 1 and decoded super-view 2 signals; and a spatial view demultiplexer which receives said decoded super-view 1 an decoded super-view 2 signals and said arrangement data signal and separates scene signals from the decoded super-view 1 and decoded super-view 2 signals in accordance with said particular multiplex arrangement and order indicated by said arrangement data signal to provide multiple output scene signals representing said multiple different views of the scene.

2. A system for coding and decoding multiple simultaneous scene signals as claimed in claim 1 wherein said encoder and said decoder are disparity compensated.

3. A system for coding and decoding multiple simultaneous scene signals as claimed in claim 1 wherein said encoder and said decoder are motion compensated and disparity compensated.

4. A system for coding and decoding multiple simultaneous scene signals as claimed in claim 3 wherein said super-view 1 signal is encoded and decoded independently with motion compensation and said super-view 2 signal is encoded and decoded with motion compensation and disparity compensation based on said super-view 1 signal.

5. A system for coding and decoding multiple simultaneous scene signals as claimed in claim 1 wherein said encoder and decoder operate according to MPEG-2 with disparity compensation.

6. A system for coding and decoding multiple simultaneous scene signals as claimed in claim 5 wherein said super-view 1 signal is encoded and decoded independently according to an MPEG-2 main profile and said super-view 2 signal is encoded and decoded according to an MPEG-2 temporal scalability process with disparity compensation based on said super-view 1 signal.

7. A system for coding and decoding multiple simultaneous scene signals as claimed in claim 1 wherein there are at least four simultaneous scene signals in the form of video picture frames each having a particular horizontal and vertical resolution, and further comprising:

a decimator which reduces one of the horizontal and vertical resolution of at least one scene signal by at least a factor of two to produce reduced resolution video picture frame signals, said spatial view multiplexer combining the reduced resolution video picture frame signals into adjacent areas of at least one of said super-view 1 and super-view 2 signals.

8. A system for coding and decoding multiple simultaneous scene signals as claimed in claim 7 wherein said decimator horizontally decimates the scene signal and simultaneously filters the scene represented by said scene signal by using a digital filter.

9. A system for coding and decoding multiple simultaneous scene signals as claimed in claim 7 wherein said decimator vertically decimates the scene signal by a factor of two by dropping alternate field lines to achieve a progressive frame of half height.

10. A system for coding and decoding multiple simultaneous scene signals as claimed in claim 7 wherein said decimator vertically decimates the scene signal and simultaneously filters the scene represented by said scene signal by using a digital filter to achieve a progressive frame of half height.

11. A system for coding and decoding multiple simultaneous scene signals as claimed in claim 7 wherein said decimator horizontally and vertically decimates the scene signal by a factor of two to achieve a progressive frame of half height and half width.

12. A system for coding and decoding multiple simultaneous scene signals as claimed in claim 2 further including a spatial interpolator after the spatial view demultiplexer, said interpolator restoring the resolution to the decoded scene signals which was reduced by the decimator.

13. A system for coding and decoding multiple simultaneous scene signals as claimed in claim 12 wherein said interpolator horizontally and/or vertically restores the resolution by a factor of two using a digital interpolation filter.

14. A system for generating and displaying multiple simultaneous scene signals representing multiple different views of a scene, comprising:

a camera arrangement directed at a scene and producing more than two simultaneous scene signals representing multiple different views of the scene;

a spatial view multiplexer which combines said more than two simultaneous scene signals into super-view 1 and super-view 2 signals according to a particular multiplex arrangement and order and generates an arrangement data signal indicating said particular multiplex arrangement and order;

an encoder which receives said super-view 1 and super-view 2 signals and said arrangement data signal and applies an encoding operation to said super-view 1 and super-view 2 signals using compression based on redundancies between the two super-views to produce encoded super-view 1 and encoded super-view 2 signals, said encoder further including said arrangement data signal within at least one of said encoded super-view 1 and encoded super-view 2 signals;

a system multiplexer which combines said encoded super-view 1 and encoded super-view 2 signals into a multiplexed data stream, at least one of said encoded super-view 1 and super-view 2 signals including said arrangement data signal;

a transmission channel for transmitting said multiplexed data stream;

a system demultiplexer which receives said multiplexed data stream and separates said encoded super-view 1 and encoded super-view 2 signals from the multiplexed data stream;

a decoder which receives said encoded super-view 1 and encoded super-view 2 signals from said system demultiplexer, extracts said arrangement data signal from said at least one of said encoded super-view 1 and encoded super-view 2 signals, and applies a decoding operation to said encoded super-view 1 and encoded super-view 2 signals according to an inverse operation of the encoding operation in said encoder to produce decoded super-view 1 and decoded super-view 2 signals;

a spatial view demultiplexer which receives said decoded super-view 1 and decoded super-view 2 signals and said arrangement data signal and separates scene signals from the decoded super-view 1 and decoded super-view 2 signals in accordance with said particular multiplex arrangement and order indicated by said arrangement data signal to provide multiple output scene signals representing said multiple different views of the scene; and a display which simultaneously displays said multiple output scene signals.

15. A system for generating and displaying multiple simultaneous scene signals as claimed in claim 14 wherein the camera arrangement is a single camera with multiple lenses to capture multiple views.

16. A system for generating and displaying multiple simultaneous scene signals as claimed in claim 14 wherein the camera arrangement is a plurality of cameras arranged in parallel with each other at different locations and directed to the scene.

17. A system for generating and displaying multiple simultaneous scene signals as claimed in claim 14 wherein the camera arrangement comprises multiple stereo camera arrangements, each said stereo camera including at least a left and right camera aligned with each other and directed at the scene at a particular angle, the particular angle of a left camera being equal to and opposite the angle of the corresponding right camera with respect to a centerline between them directed at the scene.

18. A system for generating and displaying multiple simultaneous scene signals as claimed in claim 14 wherein the camera arrangement is a plurality of cameras arranged in a convex configuration within a scene and directed at different angles towards the scene.

19. A system for generating and displaying multiple simultaneous scene signals as claimed in claim 14 wherein the camera arrangement is a plurality of cameras arranged in a concave configuration outside a scene and directed at different angles towards the scene.

20. A system for generating and displaying multiple simultaneous scene signals as claimed in claim 14 wherein the display comprises:

a view selector which sequentially selects scene signals;

a projector which converts the scene signals into light signals; and a screen which receives the light signals and sequentially displays the scenes.

21. A system for generating and displaying multiple simultaneous scene signals as claimed in claim 17 wherein the display comprises:

a left view selector which selects scene signals from the left camera of a stereo camera arrangement;

a right view selector which selects scene signals from the corresponding right camera of a stereo camera arrangement;

a left projector which converts the scene signals from the left view selector into light signals;

a right projector which converts the scene signals from the right view selector into light signals;

a screen which receives the light signals from the left and right projectors and displays the scenes;

a left polarizing lens located between the left projector and said screen and which polarizes the light signals from said left projector;

a right polarizing lens located between the right projector and said screen and which polarizes the light signals from said right projector; and glasses with a left polarizing lens over one eye of a user and a right polarizing lens over the other eye of the user.

22. A system for generating and displaying multiple simultaneous scene signals as claimed in claim 18 wherein the display comprises:

a concave screen with a number of viewing areas related to the number of cameras; and a number of projectors related to the number of cameras and spaced from corresponding viewing areas along an arc related to the concave structure of the screen, viewers of the display being located between the projectors and the screen areas.

23. A system for generating and displaying multiple simultaneous scene signals as claimed in claim 19 wherein the display comprises:

a convex screen with a number of viewing areas related to the number of cameras; and a number of projectors related to the number of cameras and spaced from corresponding viewing areas along an arc related to the convex structure of the screen, viewers of the display being located between the projectors and the screen areas.

24. A system for generating and displaying multiple simultaneous scene signals as claimed in claim 20 wherein the screen is an auto-stereoscopic lenticular display; and the projector includes the view selector and projects stripes of alternate views based on the scene signals.

25. A system for generating and displaying multiple simultaneous scene signals as claimed in claim 14 wherein the display comprises:

a view selector which sequentially selects scene signals; and a cathode ray tube monitor which converts the scene signals into a light display of the scenes.

26. A system for generating and displaying multiple simultaneous scene signals as claimed in claim 14 wherein said encoder and said decoder are disparity compensated.

27. A system for generating and displaying multiple simultaneous scene signals as claimed in claim 14 wherein said encoder and said decoder are motion compensated and disparity compensated.

28. A system for generating and displaying multiple simultaneous scene signals as claimed in claim 27 wherein said super-view 1 signal is encoded and decoded independently with motion compensation and said super-view 2 signal is encoded and decoded with motion compensation and disparity compensation based on said super-view 1 signal.

29. A system for generating and displaying multiple simultaneous scene signals as claimed in claim 14 wherein said encoder and decoder operate according to MPEG-2 with disparity compensation.

30. A system for generating and displaying multiple simultaneous scene signals as claimed in claim 29 wherein said super-view 1 signal is encoded and decoded independently according to an MPEG-2 main profile and said super-view 2 signal is encoded and decoded according to an MPEG-2 temporal scalability process with disparity compensation based on said super-view 1 signal.

31. A system for generating and displaying multiple simultaneous scene signals as claimed in claim 14 wherein there are at least four simultaneous scene signals in the form of video picture frames each having a particular horizontal and vertical resolution, and further comprising:

a decimator which reduces one of the horizontal and vertical resolution of at least one scene signal by at least a factor of two to produce reduced resolution video picture frame signals, said spatial view multiplexer combining the reduced resolution video picture frame signals into adjacent areas of at least one of said super-view 1 and super-view 2 signals.

32. A system for generating and displaying multiple simultaneous scene signals as claimed in claim 31 wherein said decimator horizontally decimates the scene signal and simultaneously filters the scene represented by said signal using a digital filter.

33. A system for generating and displaying multiple simultaneous scene signals as claimed in claim 31 wherein said decimator vertically decimates the scene signal by a factor of two by dropping alternate field lines to achieve a progressive frame of half height.

34. A system for generating and displaying multiple simultaneous scene signals as claimed in claim 31 wherein said decimator vertically decimates the scene signal and simultaneously filters the scene represented by said scene signal using a digital filter.

35. A system for generating and displaying multiple simultaneous scene signals as claimed in claim 31 wherein said decimator horizontally and vertically decimates the scene signal by a factor of two to achieve a progressive frame of half height and half width.

36. A system for generating and displaying multiple simultaneous scene signals as claimed in claim 26 further including a spatial interpolator after the demultiplexer, said interpolator restoring the resolution to the decoded scene signals which was reduced by the decimator.

37. A system for generating and displaying multiple simultaneous scene signals as claimed in claim 36 wherein said interpolator horizontally and/or vertically restores the resolution by a factor of two using a digital interpolation filter.

38. A method of coding and decoding multiple simultaneous scene signals representing multiple different views of a scene obtained from a camera arrangement, comprising the steps of:

spatially multiplexing more than two scene signals into super-view 1 and super-view 2 signals in a particular multiplexed arrangement and order;

generating an arrangement data signal indicating said particular multiplexed arrangement and order used during said spatially multiplexing step;

encoding said super-view 1 and super-view 2 signals using compression based on redundancies between the two super-views to produce encoded super-view 1 and encoded super-view 2 signals;

transmitting on a transmission channel said encoded super-view 1 and encoded super-view 2 signals and said arrangement data signal;

receiving said encoded super-view 1 and encoded super-view 2 signals and said arrangement data signal from said transmission channel;

decoding said encoded super-view 1 and encoded super-view 2 signals according an inverse operation of the encoding to produce decoded super-view 1 and decoded super-view 2 signals; and spatially demultiplexing scene signals from the decoded super-view 1 and decoded super-view 2 signals in accordance with said particular multiplex arrangement and order as indicated by said arrangement data signal to provide multiple output scene signals representing said multiple different views of the scene.

39. A method of coding and decoding multiple simultaneous scene signals as claimed in claim 38 wherein there are at least four simultaneous scene signals in the form of streams of video picture frames, the picture frames in each stream each having a particular horizontal and vertical resolution and a corresponding picture size defined by the number of pixels in the horizontal and vertical directions, the method further comprising the steps of:

reducing one of the horizontal and vertical resolutions and the corresponding number of pixels in the horizontal or vertical direction of the picture frames in at least one scene signal by at least a factor of two to produce reduced resolution video picture frame signals prior to the spatially multiplexing step, and combining the reduced resolution video picture frame signals into adjacent areas of at least one of said super-view 1 and super-view 2 signals.

40. A method of coding and decoding multiple simultaneous scene signals as claimed in claim 39 wherein the step of reducing involves reducing the horizontal resolution of the video picture frames in the scene signal by a factor of two using a decimating filter to achieve one of an interlaced or progressive frame of half width.

41. A method of coding and decoding multiple simultaneous scene signals as claimed in claim 39 wherein the step of reducing involves reducing the vertical resolution of the video picture frames in the scene signal by a factor of two by dropping alternate field lines to achieve a progressive frame of half height.

42. A method of coding and decoding multiple simultaneous scene signals as claimed in claim 39 wherein the step of reducing involves reducing the vertical resolution of the video picture frames in the scene signal by a factor of two by using a decimating filter to achieve a progressive frame of half height.

43. A method of coding and decoding multiple simultaneous scene signals as claimed in claim 39 wherein the step of reducing involves reducing the horizontal resolution and vertical resolution of the video picture frames in the scene signal by a factor of two to achieve a progressive frame of half height and half width.

44. A method of coding and decoding multiple simultaneous scene signals as claimed in claim 39 further including the step of spatial interpolation after the step of spatially demultiplexing, said interpolating causing restoration of the horizontal or vertical picture size to the picture frames in the decoded scene signals which was reduced by the step of reducing the horizontal or vertical resolution and further causing at least partial restoration of the resolution by correcting at least some of the artifacts introduced by the steps of reducing and interpolation.

45. A method of coding and decoding multiple simultaneous scene signals as claimed in claim 44 wherein said step of interpolating uses a digital interpolating filter and increases the number of pixels in the picture frames in the decoded scene signals in one of the horizontal and vertical direction thereby increasing the picture size by a factor of two.

46. A method of coding and decoding multiple simultaneous scene signals as claimed in claim 38 wherein the steps of encoding and decoding are performed with disparity compensation.

47. A method of coding and decoding multiple simultaneous scene signals as claimed in claim 38 wherein the steps of encoding and decoding are performed with motion compensation and disparity compensation.

48. A method of coding and decoding multiple simultaneous scene signals as claimed in claim 47 wherein said super-view 1 signal is encoded and decoded independently with motion compensation and said super-view 2 signal is encoded and decoded with motion compensation and disparity compensation based on said super-view 1 signal.

49. A method of coding and decoding multiple simultaneous scene signals as claimed in claim 38 wherein the steps of encoding and decoding are performed according to MPEG-2 with disparity compensation.

50. A method of coding and decoding multiple simultaneous scene signals as claimed in claim 49 wherein said super-view 1 signal is encoded and decoded independently according to an MPEG-2 main profile and said super-view 2 signal is encoded and decoded according to an MPEG-2 temporal scalability process with disparity compensation based on said super-view 1 signal.

51. A method of generating and displaying multiple simultaneous scene signals representing multiple different views of a scenes comprising the steps of:

directing a camera arrangement at a scene and producing more than two simultaneous scene signals representing multiple different views of the scene, each scene signal comprising a stream of video picture frames;

spatially multiplexing said more than two simultaneous scene signals into super-view 1 and super-view 2 signals in a particular multiplexed arrangement and order;

generating an arrangement data signal indicating said particular multiplexed arrangement and order used during said spatially multiplexing step;

encoding said super-view 1 and super-view 2 signals using compression based on redundancies between the two super-views to produce encoded super-view 1 and encoded super-view 2 signals;

transmitting said encoded super-view 1 and encoded super-view 2 signals and said arrangement data signal;

receiving said encoded super-view 1 and encoded super-view 2 signals and said arrangement data signal;

decoding said encoded super-view 1 and encoded super-view 2 signals according to an inverse of the encoding in order to produce decoded super-view 1 and decoded super-view 2 signals;

spatially demultiplexing scene signals from the decoded super-view 1 and decoded super-view 2 signals in accordance with said particular multiplexed arrangement and order as indicated by said arrangement data signal to provide multiple output scene signals representing said multiple different views of the scene; and displaying simultaneously said multiple output scene signals.

52. A method of generating and displaying multiple simultaneous scene signals as claimed in claim 51 wherein the camera arrangement is a single camera with multiple lenses to capture multiple views.

* * * * *